United States Patent
Ito et al.

[15] 3,650,161
[45] Mar. 21, 1972

[54] AUTOMATIC SHIFT CONTROL SYSTEM FOR AUTOMATIC TRANSMISSION

[72] Inventors: Shin Ito; Seitoku Kubo; Takakazu Mori, all of Toyota, Japan

[73] Assignee: Toyota Jidosha Kogyo Kabushiki Kaisha, Toyota-shi, Japan

[22] Filed: June 2, 1970

[21] Appl. No.: 42,753

[30] Foreign Application Priority Data

Oct. 18, 1969 Japan..................................44/83411

[52] U.S. Cl....................................74/866, 74/867, 74/335, 74/752 D
[51] Int. Cl......................B60k 21/00, F16h 5/06, F16h 5/42
[58] Field of Search.................................74/865–868, 863, 74/864, 869

[56] References Cited

UNITED STATES PATENTS

| 3,494,223 | 2/1970 | Mori | 74/869 X |
| 3,433,101 | 3/1969 | Scholl et al. | 74/866 |
| 3,505,909 | 4/1970 | Maurice | 74/864 |
| 2,926,543 | 3/1960 | Holdeman et al. | 74/869 |

*Primary Examiner*—Arthur T. McKeon
*Attorney*—Cushman, Darby & Cushman

[57] ABSTRACT

An automatic shift control system for a fluid controlled automatic transmission for a vehicle including a manual valve having a first position for establishing a relatively high forward drive ratio and a second position for establishing a relatively low forward drive ratio, a shift valve for controlling a plurality of fluid passages leading to brake bands and clutches from the manual valve to control the operation of the brake bands and clutches, and a solenoid for controlling the operation of the shift valve so that, in the first position of the manual valve, a low and a high forward drive ratio are obtained respectively, depending on the energization and de-energization of the solenoid, while in the second position of the manual valve, a low and a high forward drive ratio are obtained respectively which is dependent on the de-energization and energization of the solenoid.

9 Claims, 27 Drawing Figures

INVENTORS
SHIN ITO
SEITOKU KUBO
TAKAKAZU MORI

BY Cushman, Darby & Cushman
ATTORNEYS

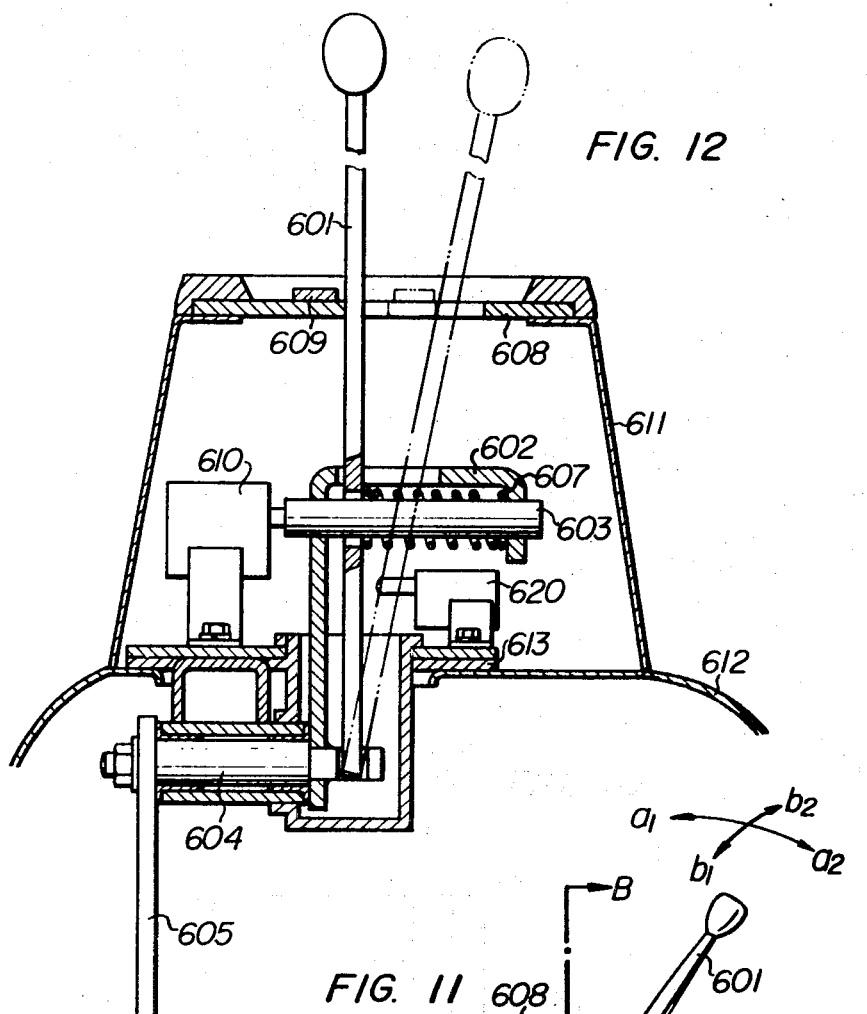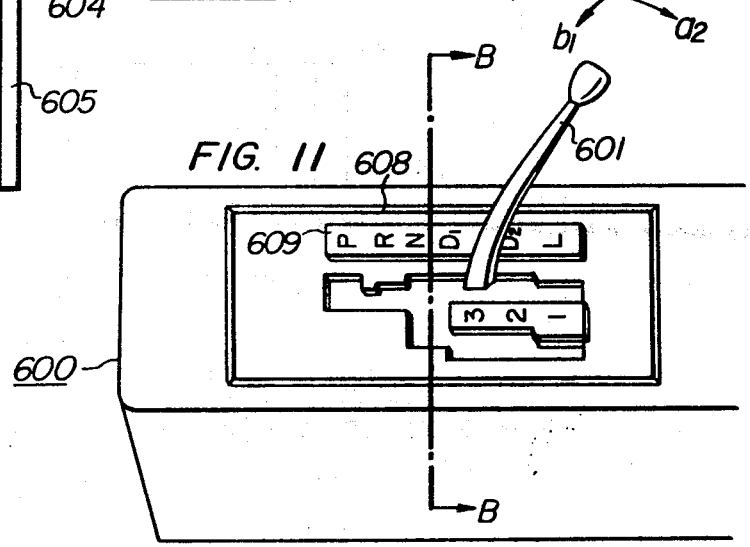

INVENTORS
SHIN ITO
SEITOKU KUBO
TAKAKAZU MORI
BY Cushman, Darby & Cushman
ATTORNEYS

AUTOMATIC SHIFT CONTROL SYSTEM FOR AUTOMATIC TRANSMISSION

BACKGROUND OF THE INVENTION

1. Field of the Invention

This invention relates to automatic transmissions for vehicles and more particularly to a combined electrical and hydraulic control system for such an automatic transmission.

2. Description of the Prior Art

Conventional fluid controlled automatic transmissions employing therein an electrical control system for the shift signal control have been defective in that an unsatisfactory shift control results from trouble occurring in the electrical control system and it is no more possible to drive the vehicle at a suitable speed ratio for the driving condition at that time.

SUMMARY OF THE INVENTION

With a view to overcome the above defect, it is a primary object of the present invention to provide improvements in the electrical and hydraulic control systems in such automatic transmission so that, in the event of trouble occurring in the electrical control system, a shift lever disposed adjacent to the driver's seat may be suitably manipulated to select a speed ratio suitable for the driving condition, thereby to ensure a comfortable drive. In a preferred embodiment of the present invention, the shift lever is movable in four directions within two parallelly arranged guide slots so as to be selectively moved to one of six positions in the forward range. One of the two parallelly arranged guide slots is similar to that provided for conventional automatic transmissions and serves for the automatic shift range. The other guide slot serves for the semiautomatic shift range and manipulation of the shift lever within this slot enables the vehicle to run at a speed ratio according to the driver's preference. The semiautomatic shift range which will be described in detail later is controlled independently of the electrical control system in response to the manipulation of the shift lever and is not affected by any trouble which may occur in the electrical control system. The provision of a transmission having six forward positions each giving a different shift range can thus realize a drive which is much wider in variety than heretofore. To this end, the shift lever system, the electrical control system and the hydraulic control system must be greatly modified.

This invention relates to improvements in the electrical and hydraulic control systems in such an automatic transmission. In accordance with the present invention which attains the above object, there is provided, in a fluid controlled automatic transmission for a vehicle having a hydraulic torque converter, a gear unit, frictionally engaging means for accomplishing the selective meshing engagement of the gears in said gear unit, servo means operatively associated with said frictionally engaging means for producing ratio changes by selectively actuating said frictionally engaging means, and a hydraulic actuating circuit connecting said servo means to a source of fluid pressure, an automatic shift control system comprising a manual shift range setting valve means having a first position for establishing a relatively high forward drive ratio and a second position for establishing a relatively low forward drive ratio, shift valve means disposed in a plurality of fluid passages connecting said manual shift range setting valve means with said servo means for said frictionally engaging means to selectively allow and interrupt the flow of fluid through said fluid passages so as to thereby control the operation of said frictionally engaging means, and means for controlling the operation of said shift valve means so that a high forward drive ratio is given when the said shift valve means is urged to one position by said shift valve control means in the first position of said manual shift range setting valve means, while in the second position of said manual shift range setting valve means, the same position of said shift valve means gives a low forward drive ratio.

In accordance with the present invention, there is further provided an automatic shift control system of the above character in which, when said manual shift range setting valve means is in the first position, a low and a high forward drive ratio are obtained respectively, depending on the energization and de-energization of said shift valve control means, while when said manual shift range setting valve means is in the second position, a low and a high forward drive ratio are obtained respectively depending on the de-energization and energization of said shift valve control means.

Other objects, features and advantages of the present invention will become apparent from the following detailed description taken in conjunction with the accompanying drawings.

BRIEF DESCRIPTION OF THE DRAWINGS

FIG. 11 is a perspective view of a shift lever system employed in the present invention.

FIG. 12 is a sectional view taken on the line B—B in FIG. 11 to show the internal structure of the shift lever system.

Figure 1:
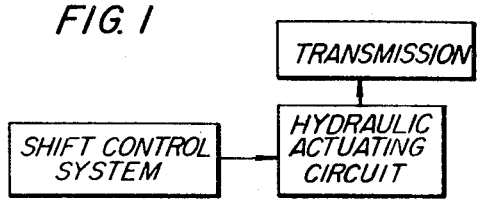
FIG. 1 is a block diagram of an automatic transmission according to the present invention.

DESCRIPTION OF THE PREFERRED EMBODIMENTS:

Referring to FIG. 1, the constituent of the automatic transmission embodying the present invention may be broadly divided into a shift control system including a source of electrical power supply, shift lever means and shift computing circuits, a transmission unit including a hydraulic torque converter, a speed changing gear unit and frictionally engaging means, and a hydraulic actuating system including fluid passages, shift valves for switching over the fluid passages upon receiving a signal from the shift control system, and a source of fluid pressure for actuating the frictionally engaging means. These components will be described in detail hereinafter.

STRUCTURE OF THE TRANSMISSION

Figure 2:
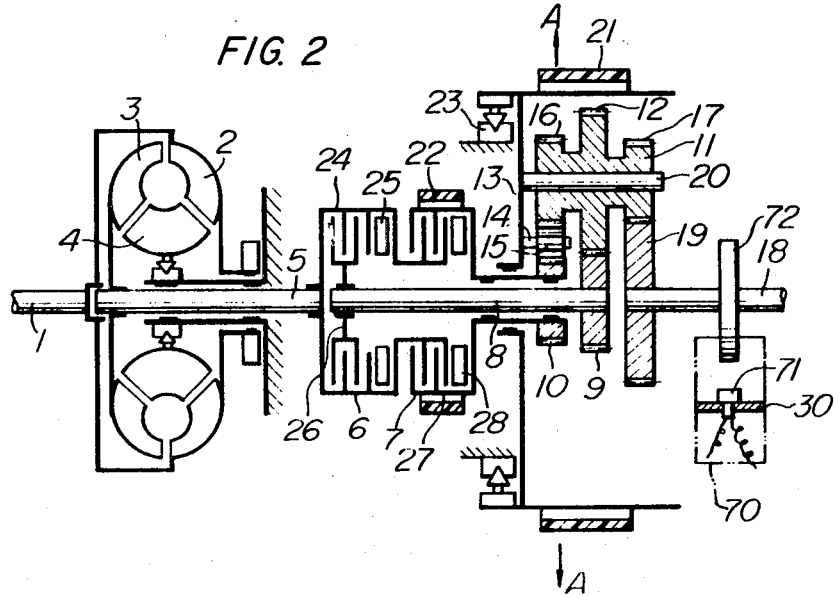
FIG. 2 is a schematic sectional view of a transmission unit to which the present invention is applied.

A torque converter automatic transmission having three forward speeds and one reverse speed as shown in FIG. 2 will be taken as a typical example of an automatic transmission. In FIG. 2, the structure of such a fluid controlled automatic transmission is schematically shown.

A torque converter unit includes a pump impeller 2 directly connected to a crankshaft 1 of an engine. The power developed by the engine is transmitted from the pump impeller 2 to a turbine impeller 3 through the medium of hydraulic fluid, and the fluid is returned to enter the pump impeller 2 again by being guided by a stator 4. A rotational force can be continuously derived from a turbine shaft 5 by the repeated operation of the above fluid flow. This rotational force is transmitted from the turbine shaft 5 to a gear unit disposed at the output side of the torque converter unit. As is commonly known, multiple disc clutch means 6 and 7 and brake band means 21 and 22 are automatically controlled by fluid pressure supplied from associated servo means as required and cooperate with a planetary gear mechanism to provide three forward speeds and one reverse speed.

The structure of the gear unit disposed at the output side of the torque converter unit will now be described. The turbine impeller 3 is connected to the turbine shaft 5 which acts as a power input shaft of the planetary gear mechanism. The turbine shaft 5 is splined to a drum 24 for unitary rotation therewith. Disposed within the drum 24 is a multiple disc clutch 6 (hereinafter to be referred to as a front clutch) which is engaged by means of a piston 25 actuated by fluid pressure and that is released by means of back-up springs. The drive plates of the front clutch 6 are externally splined to engage the internally splined portion of the drum 24, and the clutch discs are internally splined to engage the externally splined portion of a hub 26 so as to be locked against free rotation. The hub 26 is internally splined to engage the externally splined portion of an intermediate shaft 8. The clutch discs of a multiple disc clutch 7 (hereinafter to be referred to as a rear clutch) are internally splined to engage the externally splined portion of the front clutch drum 24 as shown so as to be locked against free rotation. Thus, the clutch discs of the rear clutch 7 rotate in unison with the front clutch drum 24. The driven plates of the rear clutch 7 are externally splined to engage the internally splined portion of a clutch drum 27 of the rear clutch 7. The rear clutch 7 is engaged by means of a fluid pressure actuated piston 28 and disengaged when the fluid pressure applied to the piston 28 is released.

Figure 3:
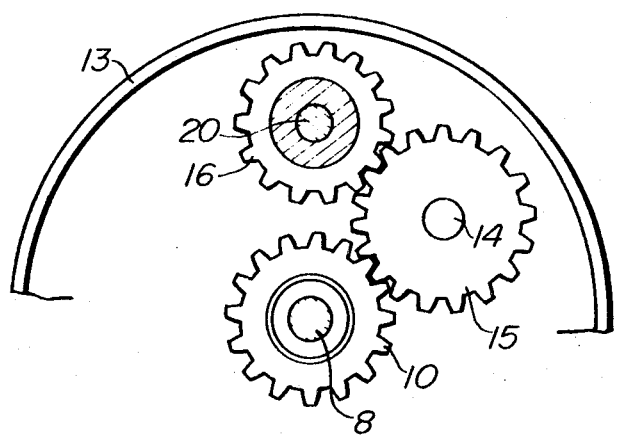
FIG. 3 is an enlarged sectional view taken on the line A—A in FIG. 2 with parts cut away to show in detail the relation between an idler gear (not shown in FIG. 2) and the sun gear and planet pinion.

The intermediate shaft 8 which is splined to the hub 26 of the front clutch 6 is connected at its rear end to an input sun gear 9. The rear clutch drum 27 is fixed to a reverse sun gear 10 by a suitable locking means. The input sun gear 9 meshes with each gear 12 of a plurality of, for example, two or three planet pinions 11. The reverse sun gear 10 meshes with idler gears 15 (shown in FIG. 3) which are each rotatably mounted on a pin 14 fixed at one end to a carrier 13, and the idler gears 15 in turn meshes with gears 16 of the planet pinions 11.

The rearmost gear 17 of each planet pinion 11 meshes with a gear 19 mounted at the front end of an output shaft 18 of the transmission. The planet pinions 11 having the gears 16, 12 and 17 and the idler gears or pinions 15 are carried by the carrier 13 by means of pinion pins 20 and 14, respectively. A brake band 21 (hereinafter to be referred to as a rear brake band) encircles the carrier 13 for applying a brake to the latter, and thus the carrier 13 can be fixed against rotation and allowed to freely rotate by fastening and releasing the rear brake band 21. Similarly, a brake band 22 (hereinafter to be referred to as a front brake band) encircles the rear clutch drum 27 so that the rear clutch drum 27, hence the sun gear 10 can be fixed against rotation and allowed to freely rotate by fastening and releasing the front brake band 22. A one-way clutch 23 associated with the carrier 13 functions in a manner similar to the rear brake band 21 in low gear set forth hereunder.

With the above structure, three forward speeds and one reverse speed can be obtained by selectively actuating the elements described above in the following manner:

First speed

The front clutch 6 and the rear brake band 21 are actuated. (However, when the transmission is driven from the engine, the rear brake band 21 may not be actuated since the one-way clutch 23 is actuated to give the same result as that obtained with the actuation of the rear brake band 21. In this case, however, no driving force is transmitted from the output shaft 18 to the engine.) With the front clutch 6 and the rear brake band 21 so actuated, the rotation of the turbine shaft 5 is directly transmitted to the input sun gear 9 through the front clutch 6. Due to the fact that the carrier 13 is locked against rotation by the rear brake band 21, the pinion pins 20 are also held stationary and the rotation of the turbine shaft 5 is transmitted from the gear 9 to the gears 12, thence through the gears 17 to the gear 19 on the output shaft 18 in a speed reducing relation similar to that of an ordinary gear train, thereby providing the first speed.

Second speed

The front clutch 6 is kept actuated and the front brake band 22 is actuated while releasing the rear brake band 21. Thus, the input sun gear 9 is rotated in unison with the turbine shaft 5, but the rear clutch drum 27, hence the reverse sun gear 10 is locked against rotation by the front brake band 22. In this state, the rotation of the turbine shaft 5 is directly transmitted to the input sun gear 9, and the sun gear 9 urges the pinions 11 to rotate in a direction (counterclockwise) opposite to the direction of rotation (clockwise) of the turbine shaft 5. The planet pinions 11 rotating in this direction tend to rotate the idler gears 15 clockwise through the gears 16. However, due to the fact that the gear 10 meshing with the gears 15 is locked against rotation, the pinion pins 14 revolve clockwise around the gear 10. This revolving motion is imparted to the rotation of the input sun gear 9 and the gear 19 carried by the output shaft 18 which gears are coaxial with and rotate in the same direction as the turbine shaft 5. Since the number of teeth of the gear 12 is selected to be greater than the number of teeth of the gear 17, the number of revolutions of the intermediate shaft 8 is greater than that of the output shaft 18. In other words, the output shaft 18 is rotated at a reduced speed or second speed.

Third speed

The third speed can be obtained by engaging both the front and rear clutches 6 and 7. The input sun gear 9 and the reverse sun gear 10 are rotated in unison and the whole planetary gear system is unitarily rotated so that the output shaft 18 is rotated at the rotating speed of the turbine shaft 5.

Reverse

When reversing, the rear clutch 7 and the rear brake band 21 are actuated. The carrier 13, hence the pinion pins 14 and 20 are thereby locked against revolution, and the rotation of the turbine shaft 5 is transmitted through the rear clutch 7 to the reverse sun gear 10, thence through the pinions 15, 16 and 17 to the gear 19 mounted on the output shaft 18 so that the output shaft 18 is rotated in the reverse direction.

HYDRAULIC ACTUATING SYSTEM

The arrangement of a hydraulic actuating system preferably used in combination with the automatic transmission according to the present invention is diagrammatically shown in FIGS. 4 through 8. Briefly, the hydraulic actuating system comprises a fluid pressure source 100 and a hydraulic actuating circuit 110. The hydraulic actuating circuit 110 includes a manual valve 120, a 1–2 shift means 130, a 2–3 shift means 135, a check valve 140 and fluid passages. The fluid pressure source 100 includes an oil pump 101, an oil strainer 102, a pressure regulator valve 105, a relay valve 150, a check valve 103, an oil cooler 104 and fluid passages. The fluid pressure source 100 functions to supply fluid under pressure to the torque converter, to the gears for lubricating same and to the hydraulic actuating circuit 110.

Figure 4:
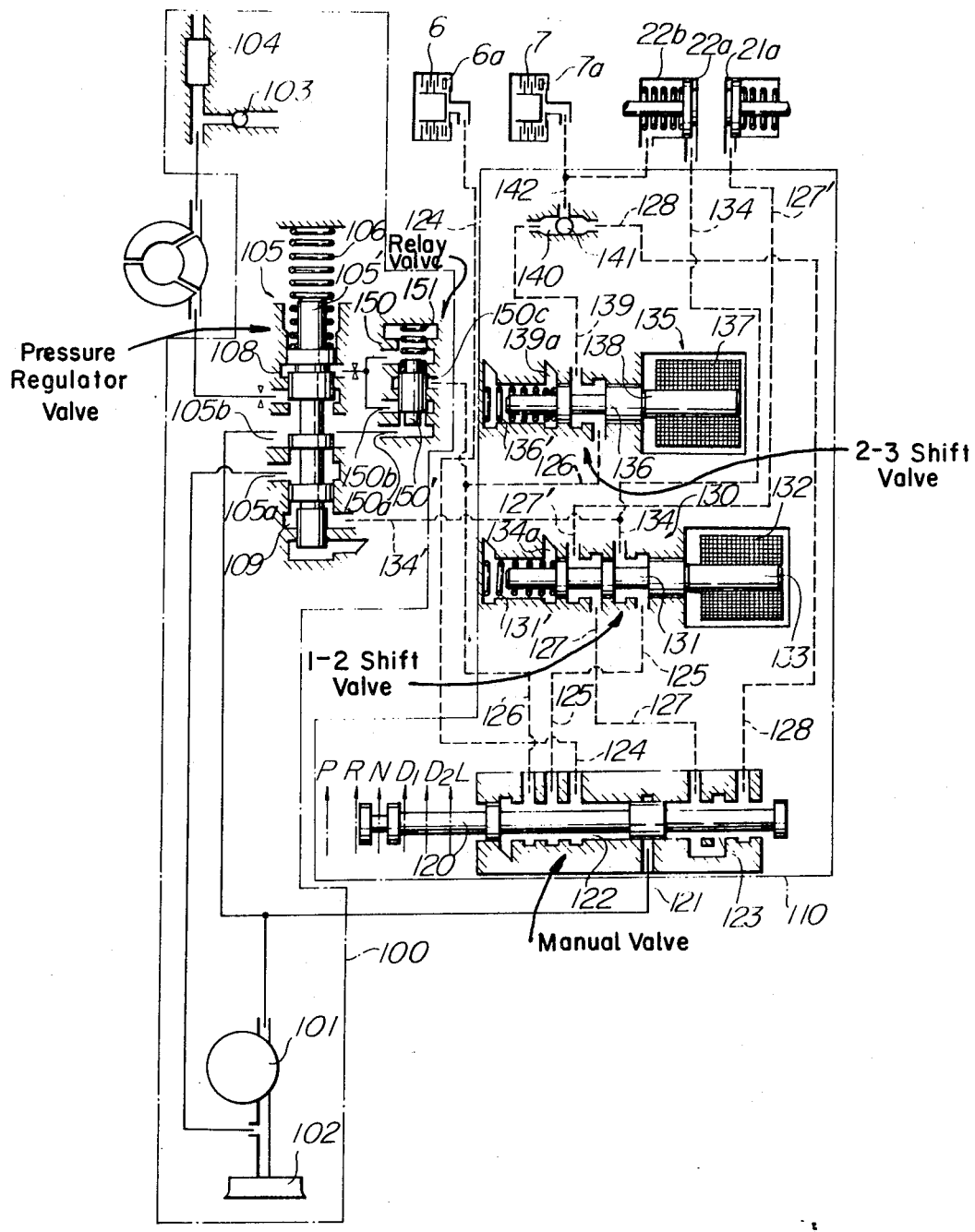
FIGS. 4 through 8 are diagrammatic views illustrating the operation of a hydraulic actuating circuit when the present invention is adapted to a three-forward speed automatic transmission in which the hydraulic actuating circuit is shown in its N position, $D_1$ position - 3rd speed, $D_2$ position - 2nd speed, L position - 1st speed and L position - 2nd speed, respectively.
Figure 5:
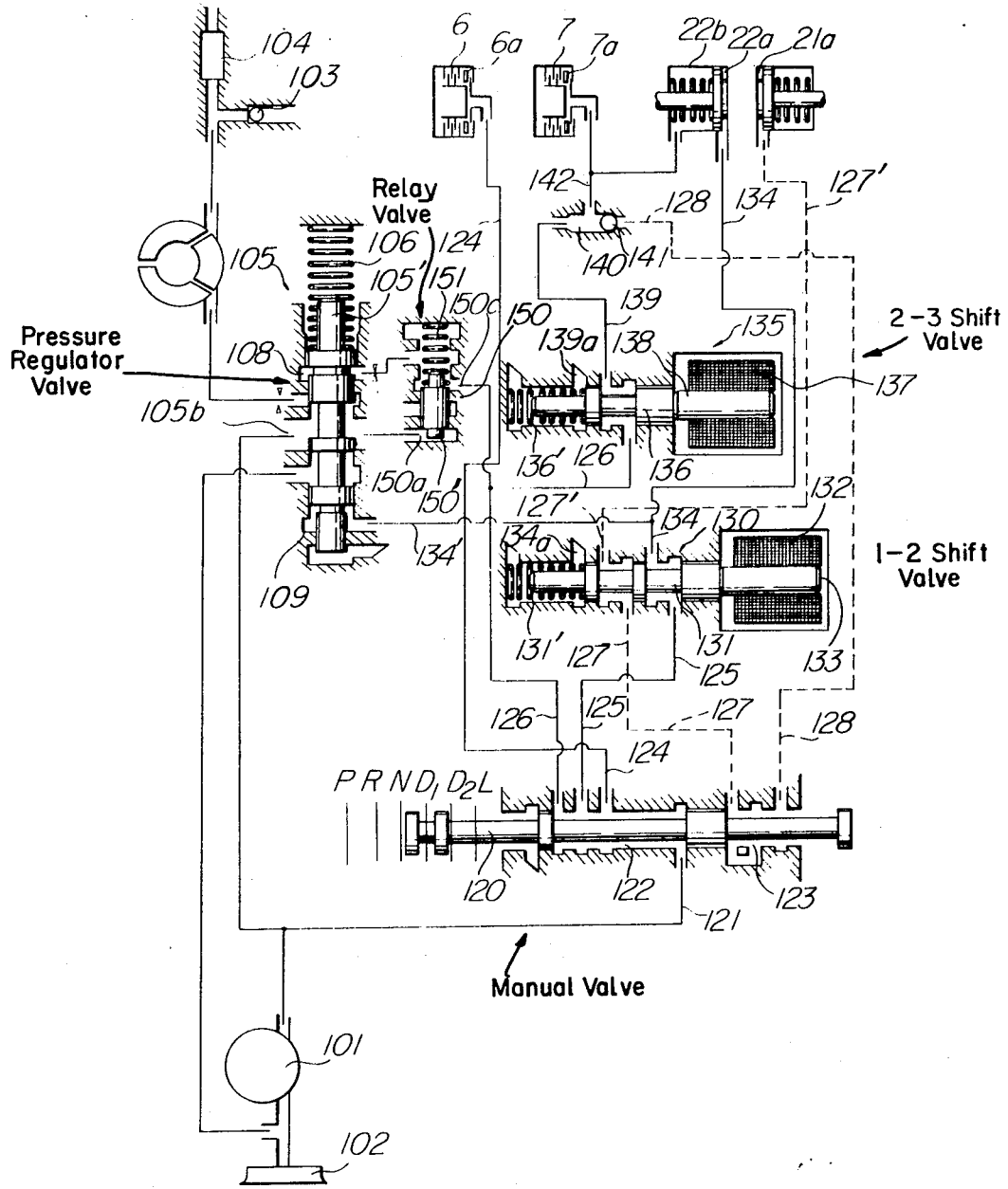

The manual valve 120 is connected with a shift lever 601 (shown in FIGS. 11 and 12) disposed adjacent to the driver's seat and takes one of the P, R, N, $D_1$, $D_2$ and L positions. Now, when the manual valve 120 takes the N position, a fluid passage 121 is closed and valve chambers 122 and 123 are exhausted as seen in FIG. 4. At the $D_1$ position of the manual valve 120, the fluid passage 121 communicates with fluid passages 124, 125 and 126 as seen in FIG. 5. The fluid passage 124 leads directly to a front clutch servo chamber 6a, and the fluid passage 125 leads to the apply side 22a of a servo for the front brake band 22 through the 1–2 shift means 130, while the fluid passage 126 leads to a rear clutch servo chamber 7a and to the release side 22b of the servo for the front brake band 22 through the 2–3 shift means 135 and the check valve 140. The 1–2 shift means 130 includes a 1–2 shift valve element 131 and a solenoid 132. One end (or the right-hand end as viewed in the drawing) of the valve element 131 is abutted by a moving core 133 of the solenoid 132. When no current is supplied to the solenoid 132, the valve element 131 is urged to its rightward position by a spring 131' engaging the other or left-hand end of the valve element 131 so that the fluid passage 125 communicates with a fluid passage 134 to supply fluid to the apply side 22a of the servo for the front brake band 22 to apply the front brake band 22. When current is supplied to the solenoid 132, the moving core 133 urges the valve element 131 to the leftward position by being actuated by the electromagnetic force of the solenoid 132 so that the communication between the fluid passages 125 and 134 is interrupted and the fluid passage 134 communicates with a fluid passage 127 to be exhausted thereby releasing the front brake band 22. Similarly, the 2–3 shift means 135 includes a 2–3 shift valve element 136 and a solenoid 137. One end (or the right-hand end as viewed in the drawing) of the valve element 136 is engaged by a moving core 138 of the solenoid 137. When no current is supplied to the solenoid 137, the valve element 136 is urged to its rightward position by a spring 136' engaging the other or left-hand end of the valve element 136 so that the fluid passage 126 communicates with a fluid passage 139 to force a check ball element 141 of the check valve 140 towards the fluid passage 128 to block the fluid passage 128. As a result, the fluid passage 139 communicates with a fluid passage 142 to supply fluid to the rear clutch servo chamber 7a and to the release side 22b of the servo for the front brake band so as to engage the rear clutch 7 and release the front brake band 22. When current is supplied to the solenoid 137, the valve element 136 is urged leftward so that the communication between the fluid passages 126 and 139 is interrupted and the fluid passage 139 communicates with a pressure discharge port 139a to be exhausted.

In the first speed at the $D_1$ drive range position or $D_1$ position - 1st speed, both the solenoids 132 and 137 are energized and the front clutch 6 is solely engaged by the supply of fluid to the front clutch servo chamber 6a through the fluid passage 124. Accordingly, when the transmission is driven from the engine, the one-way clutch 23 is engaged to lock the carrier 13 against rotation so that the first speed can be obtained. In this case, however, no driving force can be transmitted to the engine from the output shaft 18 since a freewheeling condition appears.

In the second speed at the $D_1$ drive range position or $D_1$ position - 2nd speed, the fluid passage 124 leading to the front clutch servo chamber 6a is kept pressurized and the solenoid 132 for the 1–2 shift valve element 131 is de-energized with the result that the fluid passage 125 communicates with the fluid passage 134 to supply fluid to the apply side 22a of the servo for the front brake band 22 to apply the front brake band 22. Thus, the second speed can be obtained.

Figure 6:
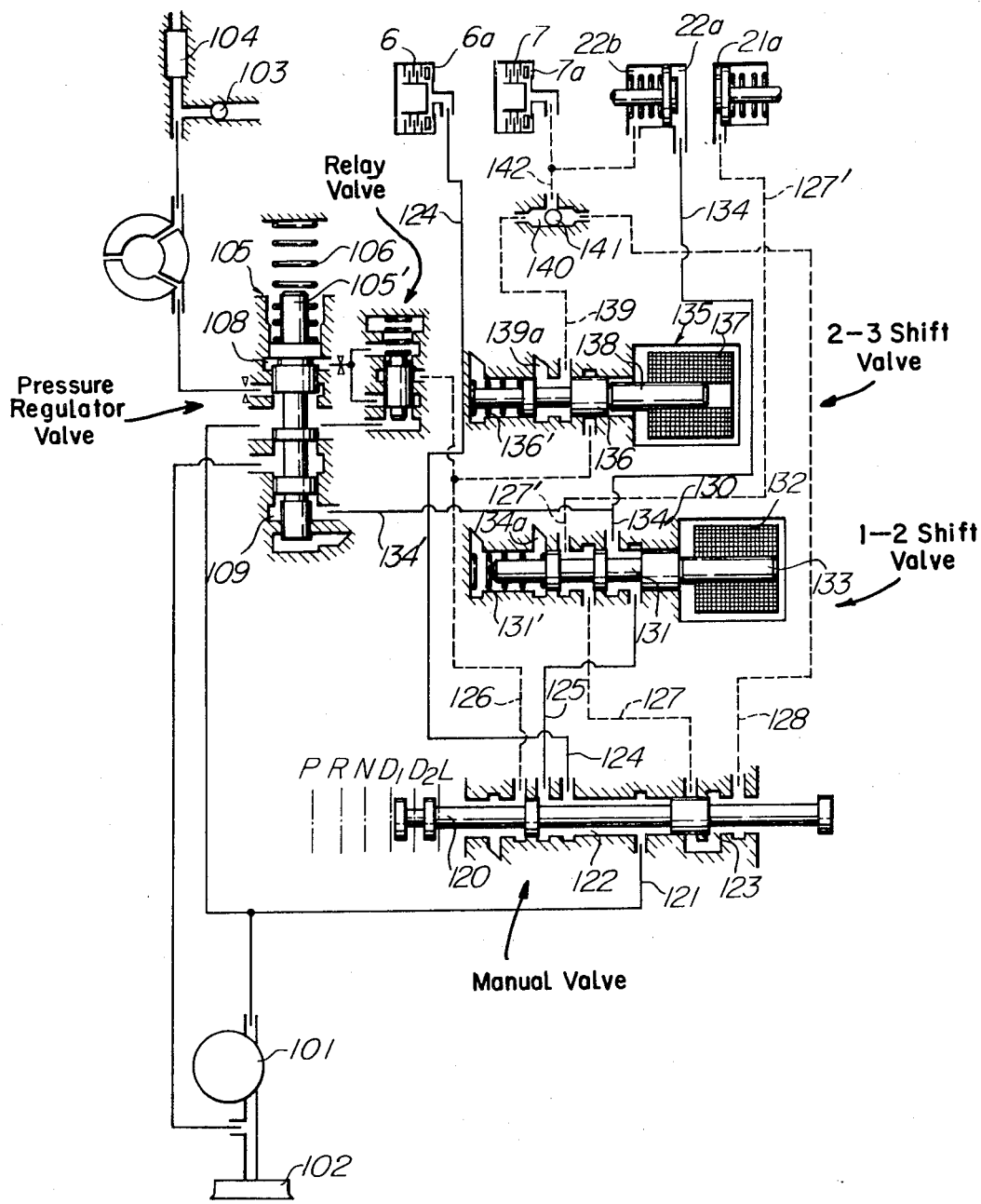

In the third speed at the $D_1$ drive range position or $D_1$ position - 3rd speed shown in FIG. 5, the solenoid 137 for the 2–3 shift valve element 136 is de-energized in addition to the previous de-energization of the solenoid in the $D_1$ position - 2nd speed with the result that the fluid passage 126 communicates with the fluid passage 139 to supply fluid to the rear clutch servo chamber 7a to engage the rear clutch 7 while releasing the front brake band 22. Thus, the third speed can be obtained.

when the manual valve 120 is urged to the $D_2$ position shown in FIG. 6, the fluid passage 126 leading to the 2–3 shift means 135 is exhausted and the fluid passages 124 and 125 communicate solely with the fluid pressure source 100. Accordingly, it is impossible to obtain the third speed, regardless of the de-energization of the solenoid 137 for the 2–3 shift valve element 136 and the first and second speeds can be achieved, depending on the energization and de-energization of the solenoid 132 for the 1–2 shift valve element 131.

Figure 7:
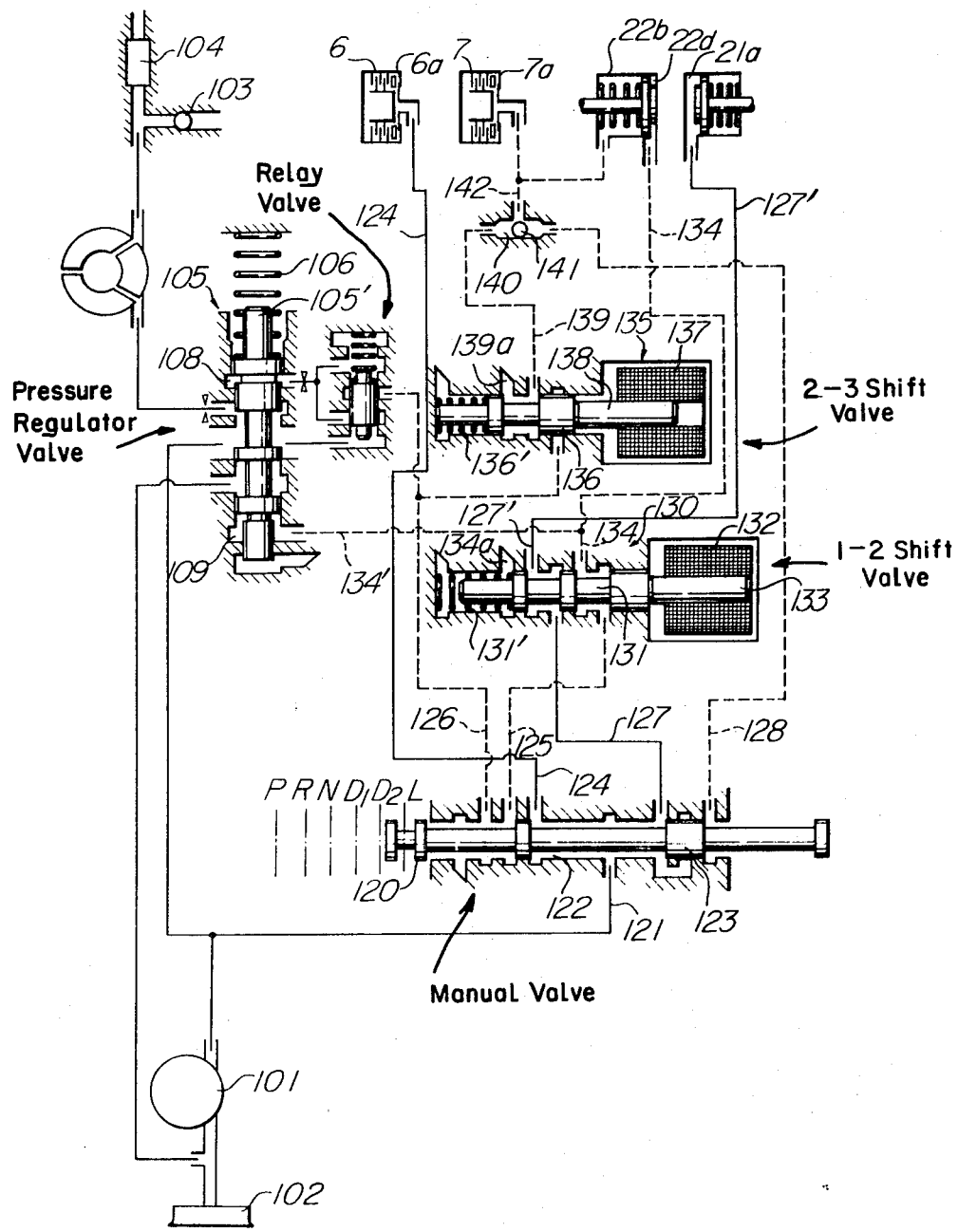
Figure 8:
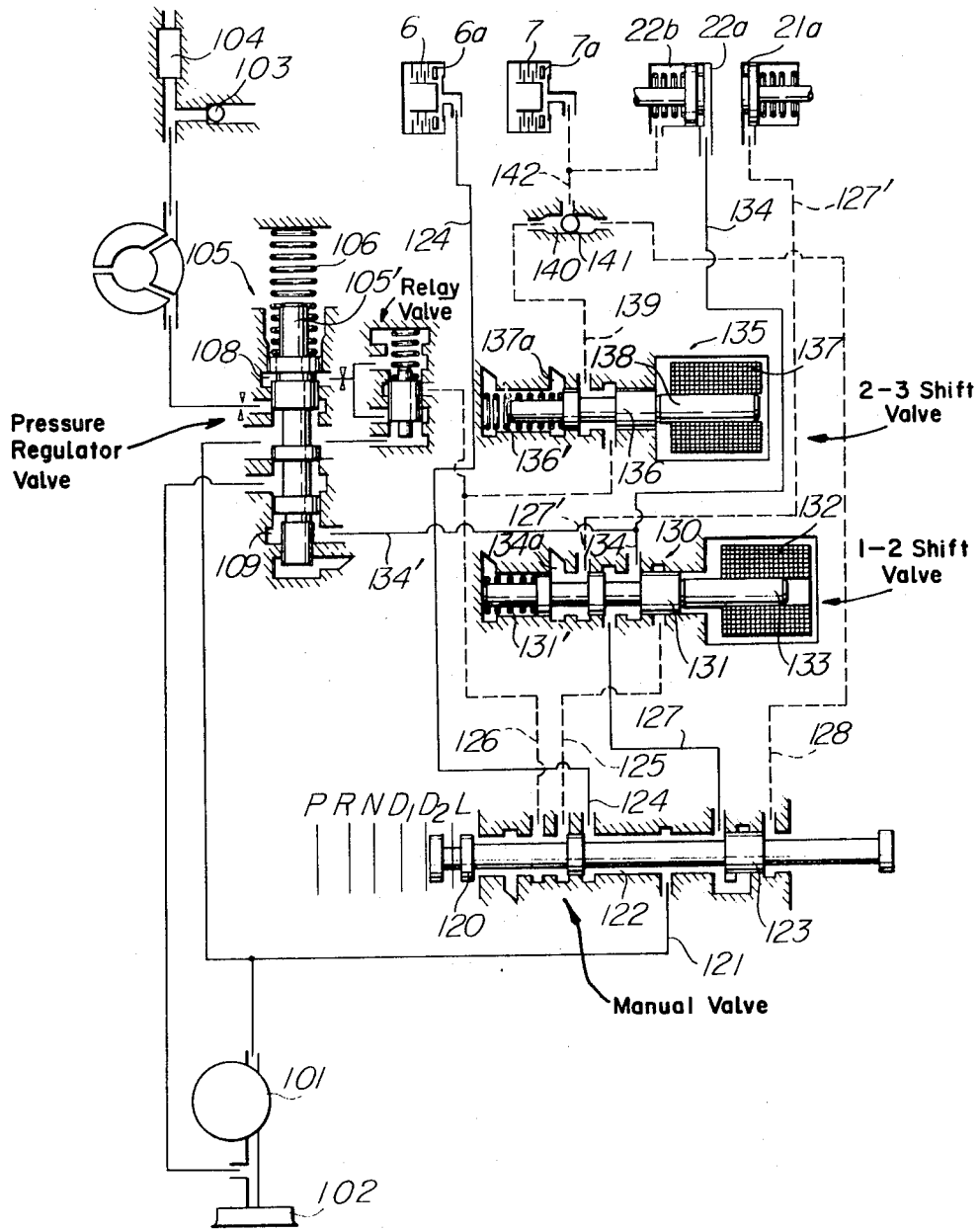

When the manual valve 120 is urged to the L position, the fluid passages 125 and 126 are exhausted and the fluid passages 124 and 127 communicate with the fluid pressure source 100. When, in this case, no current is supplied to the 1–2 shift solenoid 132 and the 1–2 shift valve element 131 takes its rightward position as seen in FIG. 7, the fluid passage 127 communicates with a fluid passage 127' to supply fluid to the apply side 21a of a servo for the rear brake band 21. Thus, the front clutch 6 is engaged and the rear brake band 21 is applied so that the first speed can be obtained. The first speed in this case differs from the first speed in the $D_1$ position in that the rear brake band 21 is applied to provide for transmission of the driving force from the output shaft to the engine thereby permitting the application of engine braking. When, on the other hand, current is supplied to the 1–2 shift solenoid 132 and the 1–2 shift valve element 131 is urged to its leftward position as seen in FIG. 8, the fluid passages 127 and 127' communicate with the fluid passage 134 and a pressure discharge port 134 and a pressure discharge port 134a, respectively, with the result that fluid is supplied to the apply side 22a of the servo for the front brake band 22 to apply the front brake band 22 while the rear brake band 21 is released. Thus, the second speed can be obtained.

When the manual valve 120 is moved to the R position, the fluid passages 124, 125 and 126 become exhausted and the fluid passages 127 and 128 thus communicate with the fluid pressure source 100. As a result, fluid is supplied to the rear clutch servo chamber 7a and to the apply side 21a of the servo for the rear brake band 21 to engage the rear clutch 7 and apply the rear brake band 21. Thus, the reverse drive condition for the vehicle can be obtained.

It will be understood from the foregoing description that the hydraulic actuating system in the present invention is featured by the fact that it comprises the combination of a novel hydraulic circuit arrangement and biasing means in the form of the springs 131' and 136' for biasing the 1–2 shift valve element 131 and the 2–3 shift valve element 136 to the rightward position in response to de-energization of the respective solenoids 132 and 137. The circuit arrangement of the hydraulic actuating system is such that, in the $D_1$ position of the manual valve 120, fluid pressure from the fluid pressure source 100 is supplied to the front clutch servo chamber 6a for the front clutch 6 through the fluid passage 124, to the apply side 22a of the servo for the front brake band 22 through the fluid passage 125 and the 1–2 shift means 130, and to the rear clutch servo chamber 7a for the rear clutch 7 and to the release side 22b of the servo from the front brake band 22 through the fluid passage 126 and the 2–3 shift means 135, respectively. In the $D_2$ position of the manual valve 120, the fluid passage 126 leading to the 2-3 shift means 135 is exhausted and the fluid passages 124 and 125 communicate with the fluid pressure source 100, while in the L position of the manual valve 120, the fluid passage 125 leading to the 1-2 shift means 130 is further exhausted and the fluid passage 127 communicating with the fluid pressure source 100 communicates with the fluid passage 134 leading to the apply side 22a of the servo for the front brake band 22 through the 1-2 shift means 130 or with the fluid passage 127' leading to the apply side 21a of the servo for the rear brake band 21. By virtue of the above combination, even in the event of the interruption of electrical power from its source to the shift signal control system which determines the energization and de-energization of the solenoids 132 and 137, the manual valve 120 may be urged to the L position for obtaining the first speed, to the $D_2$ position for obtaining the second speed and to the $D_1$ position for obtaining the third speed. Further, in the L position of the manual valve 120, the fluid passage 127 can communicate with the apply side 22a of the servo for the front brake band 22 and with the apply side 21a of the servo for the rear brake band 21 through the 1-2 shift means 130 depending on the de-energization and energization of the solenoid 132. Thus, the manual valve 120 may be shifted to the L position while driving at high speed and the solenoid 132 may be energized so as to maintain the second speed, thereby preventing the overrunning of the engine.

Such a hydraulic circuit arrangement is quite advantageous in that, when trouble occurs in the shift signal control system which controls the supply of electrical signals to the solenoids or when the driver wishes a sporty drive with a variety of speed changes compared with those carried out on the basis of the shift points primarily set forth for the electrical control system, the drive may turn off the switch connecting the voltage source with the shift signal control system to cut off the supply of power to the shift signal control system thereby rendering the shift signal control system inoperative, and may then urge the manual valve to one of the L, $D_2$ and $D_1$ positions by the shift lever so as to select the desired speed ratio. In other words, the switch may be turned on and off to select either driving under completely an automatic shift control or driving under a semiautomatic shift control as desired.

A second feature of the present invention resides in the fact that current is supplied to the solenoid 132 from the shift signal control system upon shifting to the L position during the driving at high speed so that first-speed engine braking cannot be applied to the engine, thereby preventing the engine from an abrupt engine brake and overrunning.

A third feature of the present invention resides in the fact that the solenoids 132 and 137 are in the de-energized state during the driving of the vehicle in the third speed gear. Therefore, it is unnecessary to consider any electrical power consumption due to operation of the solenoids as well as the undesirable generation of heat resulting in a temperature rise due to the current supplied to the solenoids.

Fluid pressure supplied to the servos, that is, line pressure is controlled by the pressure regulator valve 105. The pressure regulator valve 105 includes a valve spool 105' which is engaged at one or upper end by a spring 106. Fluid from the oil pump 101 is supplied through the relay valve 150 to a valve chamber 108 surrounding an upper portion of the valve spool 150'. In the $D_1$ position of the manual valve 120, the valve chamber 108 is supplied with fluid via the fluid passages 121 and 126 and the relay valve 150 having a valve spool 150' engaged by a spring 151. A valve chamber 109 surrounding a lower portion of the valve spool 105' is supplied with fluid via a fluid passage 134'. Thus, in the $D_1$ position of the manual valve 120 shown in FIG. 5, fluid pressure supplied from the oil pump 101 is fed into an upper port 150c of the relay valve 150 via the fluid passages 121 and 126. On the other hand, fluid pressure supplied from the oil pump 101 into a port 105b of the pressure regulator valve 105 is applied to a lower valve chamber 150a of the relay valve 150. The fluid pressure fed into the upper port 150c of the relay valve 150 cooperates with the spring 151 engaging the upper end of the valve spool 150' of the relay valve 150 to urge the valve spool 150' downwardly, while the fluid pressure applied to the lower valve chamber 150a of the relay valve 150 through the port 105b of the pressure regulator valve 105 imparts an upward force to the valve spool 150' of the relay valve 150. Since the fluid pressure imparted to the upper end of the valve spool 150' is equal to the fluid pressure imparted to the lower end of the valve spool 150', the downward force is stronger than the upward force by an amount corresponding to the force of the pre-stressed spring 151 with the result that the valve spool 150' of the relay valve 150 is urged to a lower preset position. Therefore, the oil pump pressure is applied to the upper chamber 108 of the pressure regulator valve 105. Upon de-energization of the 1-2 shift solenoid 132, the 1-2 shift valve element 131 is urged to its rightward position with the result that the fluid passage 125 communicates with the fluid passage 134 to supply fluid pressure to the lower valve chamber 109 of the pressure regulator valve 105 via the fluid passage 134'. In such a state, a low constant line pressure $P_{LD}$ is produced by the pressure regulator valve 105. This constant line pressure $P_{LD}$ is determined by the force of the pre-stressed spring 106 and fluid pressure (pump pressure) in the chambers 108 and 109 acting upon the different cross-sectional areas of the valve spool 105'.

Figure 9:
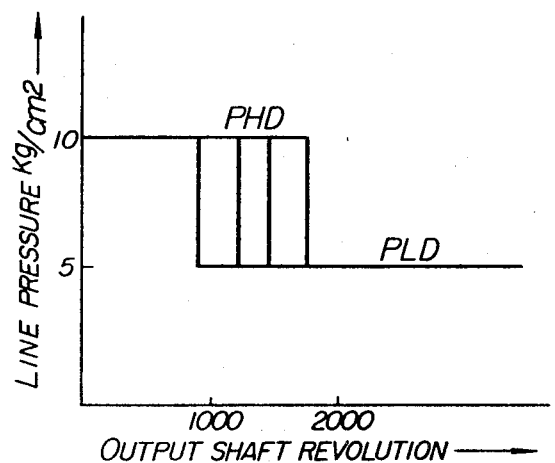
FIG. 9 is a graph showing how the line pressure controlled by the hydraulic actuating circuit in the $D_1$ position varies relative to the r.p.m. of the output shaft.

When the 1-2 shift solenoid 132 is energized to urge the 1-2 shift valve element 131 to its leftward position, the fluid passage 134 communicates with the fluid passage 127 to be drained and the lower valve chamber 109 of the pressure regulator valve 105 is exhausted. In such a state, a relatively high constant line pressure $P_{HD}$ is produced by the pressure regulator valve 105 and is determined by the force of the pre-stressed spring 106 and fluid pressure (pump pressure) in the chamber 108 acting upon the different cross-sectional areas of the valve spool 105'. It will thus be understood that, in the $D_1$ position of the manual valve 120, the relatively high constant line pressure $P_{HD}$ is produced by the pressure regulator valve 105 when the 1-2 shift valve element 131 is urged to its leftward position to provide the first speed, while the low constant line pressure $P_{LD}$ is produced by the pressure regulator valve 105 when the 1-2 shift valve element 131 is urged to its rightward position to provide the second and third speeds. FIG. 9 shows the variation in the line pressure produced by the pressure regulator valve 105 in the $D_1$ position of the manual valve 120 relative to the number of revolutions of the output shaft and hence the vehicle speed. As will be seen from FIG. 9, a step-down from the relatively high constant line pressure $P_{HD}$ to the low constant line pressure $P_{LD}$ occurs in the $D_1$ position of the manual valve 120 when the number of revolutions of the output shaft 18, hence the vehicle speed is increased and the speed ratio is changed from the first speed to second. Generally, the 1-2 shift point and 2-1 shift point are variable depending on an engine torque responsive signal. Thus, the step-down from the constant line pressure $P_{HD}$ to the constant line pressure $P_{LD}$ varies as shown depending on the engine torque responsive signal.

Figure 10:
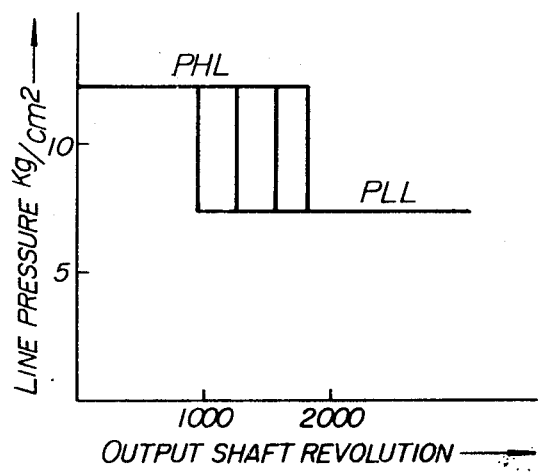
FIG. 10 is a graph showing how the line pressure controlled by the hydraulic actuating circuit in the $D_2$ or L position varies relative to the r.p.m. of the output shaft.

The fluid passage 126 is exhausted in the positions of the manual valve 120 except in the $D_1$ position. In those positions of the manual valve 120, oil pump pressure supplied from the lower valve chamber 150a of the relay valve 150 to the upper valve chamber 108 of the pressure regulator valve 105 is reduced by an amount corresponding to the force of the pre-stressed spring 151 to appear as a pressure $P_{MO}$ which is called herein a reducing pressure. In the $D_2$ position of the manual valve 120, fluid pressure is supplied to the fluid passage 125, while in the L position of the manual valve 120, fluid pressure is supplied to the fluid passage 127. Thus, as in the case of the $D_1$ position of the manual valve 120, fluid pressure is supplied via the fluid passage 134' or not supplied to the valve chamber 109 of the pressure regulator valve 105, depending on the position of the 1-2 shift valve element 131. When fluid pressure is applied to the valve chamber 109, a relatively low constant line pressure $P_{LL}$ is produced by the pressure regulator valve 105 and is determined by the force of the pre-stressed spring 106, the reducing pressure $P_{MO}$ applied to the valve chamber 108 and the pump pressure applied to the valve chamber 109. When, on the other hand, fluid pressure is not applied to the valve chamber 109, a high constant line pressure $P_{HL}$ is produced by the pressure regulator valve 105 and is determined by the force of the pre-stressed spring 106 and the reducing pressure $P_{MO}$ applied to the valve chamber 108. The valve chamber 109 is always exhausted in the P, R and N positions of the manual valve 120 and thus the high constant pressure $P_{HL}$ is produced by the pressure regulator valve 105. It will thus be understood that the high constant line pressure $P_{HL}$ and the relatively low constant line pressure $P_{LL}$ are produced by the pressure regulator valve 105 in the first and second speeds, respectively, in the $D_2$ and L positions of the manual valve 120, while the high constant line pressure $P_{HL}$ is produced by the pressure regulator valve 105 in the P, R and N positions of the manual valve 120. FIG. 10 shows the variation in the line pressure in the $D_2$ and L positions of the manual valve 120 relative to the number of revolutions of the output shaft, hence the vehicle speed. As will be seen from FIG. 10, A step-down from the constant line pressure $P_{HL}$ to the constant line pressure $P_{LL}$ occurs during the 1–2 shift when the number of revolutions of the output shaft, hence the vehicle speed is increased and the speed ratio is changed from the first speed to second. However, the level of control pressure is higher in FIG. 10 than that in FIG. 9 due to the difference in the magnitude of fluid pressure applied to the valve chamber 108 of the pressure regulator valve 105.

By virtue of the capability of obtaining the control pressure characteristic in the manner described in detail above, a line pressure taking into consideration the torque multiplying action of the torque converter can be supplied to the servo chambers for the clutches and brake bands so as to provide a sufficient engaging force in the vehicle's low speed range, while a low constant line pressure can be supplied to the servo chambers to prevent power losses including losses occurring in the oil pump and other elements when in the vehicle's high speed range, since the torque multiplying action of the torque converter is lost in the high vehicle speed range due to the fact that the torque converter acts substantially as a fluid coupling. Especially, the provision of the relay valve 150 which is used for varying the control pressure in the $D_1$ position from that in other positions is so useful that a sufficient and suitable fluid pressure can be applied to the rear clutch 7 and rear brake band 21 when reversing, and in the $D_2$ position - 2nd speed for providing a change in the driving state, a line pressure which is different from and slightly higher than that in the $D_1$ position - 2nd speed can be applied to provide for the torque multiplying action in the low speed range. Further, owing to the fact that the shift valve provided primarily for the purpose of shift control serves also as a means for varying the control pressure depending on the driving condition of the vehicle, any other valve means for this purpose is unnecessary and the hydraulic system can thereby be very much simplified.

The method of controlling the fluid pressure in the hydraulic actuating system in the present invention has various advantages and is quite useful. However, this method is not included in the subject matter of the present invention and a separate patent application therefor will be filed.

It will be understood that the 1–2 shift means 130 and the 2–3 shift means 135 are operated to vary the pressure regulating action of the pressure regulator valve 105 and to carry out the automatic speed changing operation, and this is accomplished by selectively energizing and de-energizing the solenoids 132 and 137.

Shift control by supplying current and interrupting the supply of current to the solenoids 132 and 137 is carried out by the shift control system which will be described in detail hereunder.

SHIFT CONTROL SYSTEM

The shift control system is broadly divided into a shift position selection system and a shift signal control system.

Shift Position Selection System

The shift position selection system generally designated by the reference numeral 600 is schematically shown in FIGS. 11 and 12 and includes a shift lever 601, a neutral safety switch 610, a circuit opening switch 620 and other elements. FIGS. 11 and 12 are a top perspective view and a section taken on the line B—B in FIG. 11, respectively, of the shift position selection system 600. The shift lever 601 extends through a shift lever support 602, and a shift lever pin 603 is engaged by the shift lever 601. The shift lever 601 is connected at its lower end to a control shaft 604 integral with the shift lever support 602 so as to be swingable about the axis of the control shaft 604 and is linked to the manual valve 120 in the hydraulic actuating circuit 110 through a control lever 605. The shift lever 601 is swingable not only in the direction shown by the arrow $a_1$–$a_2$ in FIG. 11 for shifting the manual valve 120, but also in a transverse direction shown by the arrow $b_1$–$b_2$ about the pivot point on the control shaft 604 by being guided by the shift lever pin 603. A spring 607 disposed around the shift lever pin 603 normally urges the shift lever 601 into the position shown by the solid lines in FIG. 12. A shift lever detent plate 608 is fixedly disposed on a console 611 secured to a body floor 612 and is provided with an H-shaped double slot in which the shift lever 601 can move. A plate 609 bearing the letters L, $D_2$, $D_1$, N, R and P and the numerals 1, 2 and 3 is disposed closely adjacent to the H-shaped double slot so as indicate the position of the shift lever 601. When the shift lever 601 is set at a position corresponding to the letter L and numeral 1 of the plate 609, the manual valve 120 in the hydraulic actuating circuit 110 linked to the shift lever 601 is urged to the L position shown in FIG. 7. Similarly, the manual valve 120 is urged to the $D_2$ position in FIG. 6, $D_1$ position in FIG. 5, N position, R position and P position when the shift lever 601 is set at respective positions corresponding to the letter $D_2$ and numeral 2, letter $D_1$ and numeral 3, letter N, letter R and letter P.

The circuit opening switch 620 is disposed on a shift lever plate 613 shown in FIG. 12 and acts to open the circuit connecting the neutral safety switch 610 to the power supply thereby to cut off the current supplied to the shift signal control system when the shift lever 601 is swung to a position shown by the chain lines in FIG. 12 and is set at one of the 1, 2 and 3 positions in the left-hand slot portion (FIG. 11) of the shift lever detent plate 608.

Figure 13:
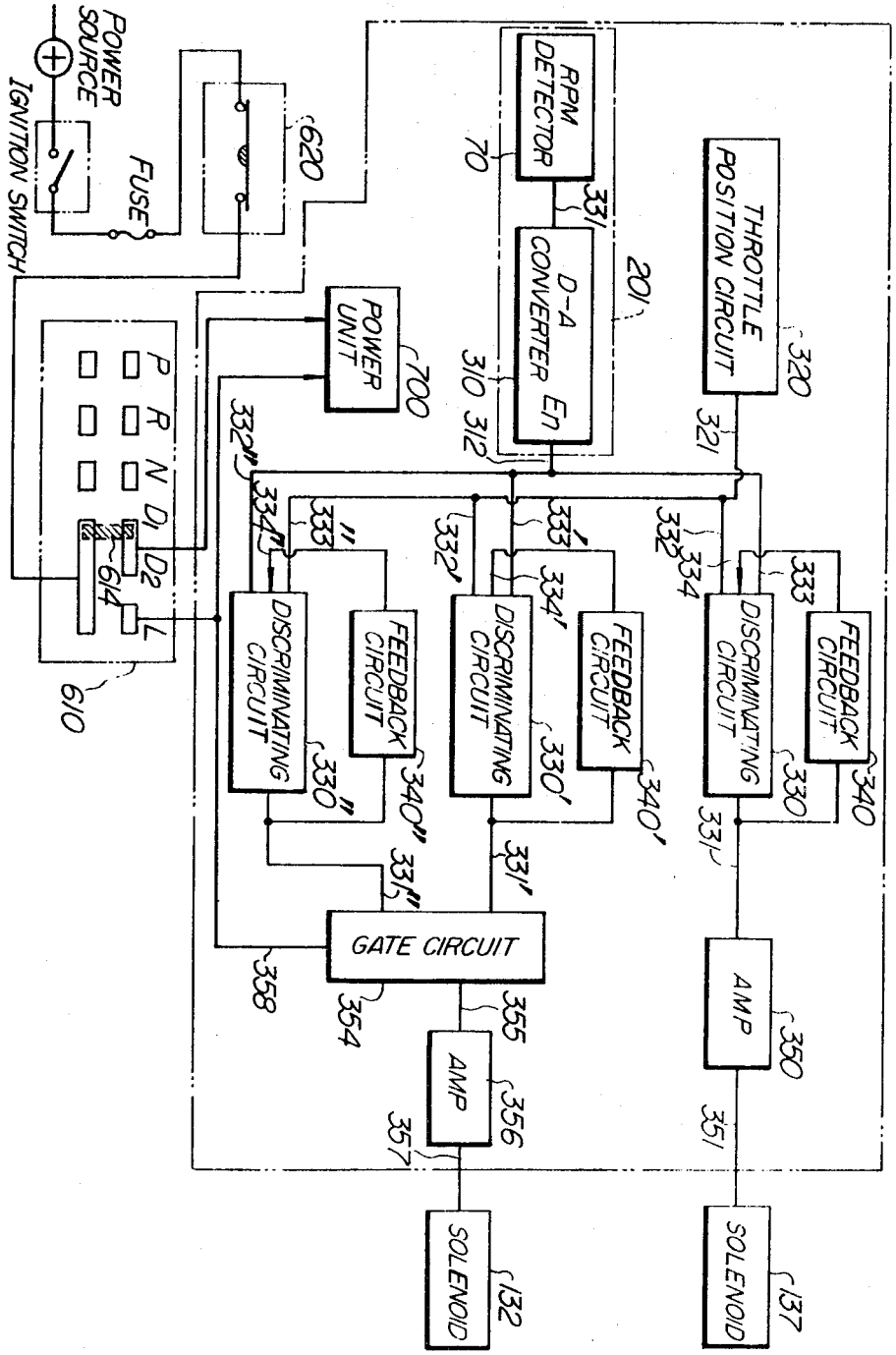
FIG. 13 is a block diagram of a shift signal control system preferably employed in the automatic transmission of the present invention.

The neutral safety switch 610 is also disposed on the shift lever plate 613 and includes a plurality of sets of contacts and a slider 614 slidable on the contacts as seen in FIG. 13. The slider 614 is moved in unison with the shift lever pin 603. Letters L, $D_2$, $D_1$, N, R and P depicted on the contacts in FIG. 13 correspond to the respective positions of the manual valve 120 in the hydraulic actuating circuit 110. In the forward positions L, $D_2$ and $D_1$, the neutral safety switch 610 acts to feed the current passing through the circuit opening switch 620 to the shift signal control system.

As will be understood from the above description, the shift position selection system 600 functions so that the shift lever 601 is shifted as desired by the driver to shift the position of the manual valve 120 in the hydraulic actuating circuit 110 thereby to switch over the fluid passages, and at the same time, to actuate the neutral safety switch 610 and circuit opening switch 620 thereby to control the current supplied to the shift signal control system.

Shift Signal Control System

The shift signal control system has a structure as shown in FIG. 13 and includes a throttle position circuit 320 for generating a signal representative of the throttle valve opening, a detector 201 for generating a signal representative of the output shaft r.p.m., discriminating circuits 330, 330' and 330" for comparing these two signals with each other, a power unit 700 for distributing current to various circuits by receiving the current through the neutral safety switch 620, a gate circuit 354, and amplifiers 350 and 356.

When the shift lever 601 is set at a forward position as shown in FIG. 13, the current supplied from the power supply is fed to the power unit 700 through the circuit opening switch 620 and neutral safety switch 610. The power unit 700 distributes the current to various circuits, which are therefore placed in operation.

Figure 14A:
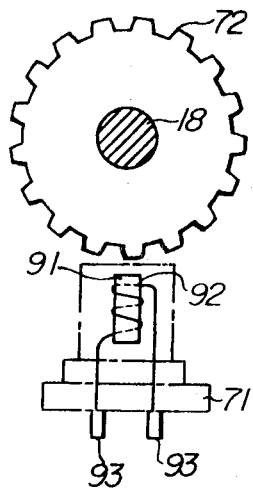
FIGS. 14a and 14b are a side elevational view and a front elevational view, respectively, of an r.p.m. detector preferably used in the shift signal control system.
Figure 14B:
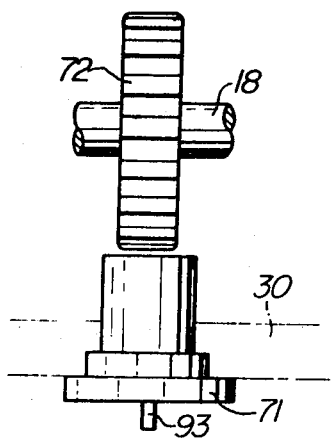

The output shaft r.p.m. detector 201 is composed of means 70 for detecting the r.p.m. of the output shaft 18 and a digital-analog converter 310. Referring to FIGS. 14a and 14b, the means 70 for detecting the r.p.m. of the output shaft 18 includes an r.p.m. detector 71 mounted on the housing 30 and a toothed disc 72 fixedly mounted on the output shaft 18 for unitary rotation therewith. Suppose that the number of teeth of the toothed disc 72 is $n$, for example, $n = 32$, then the r.p.m. detector 71 detects an electrical signal $S$ having a frequency which is $n$ times the r.p.m. $N$ of the output shaft 18. Thus, $S = n \cdot N$.

Knowing the r.p.m. $N$ of the output shaft 18 enables the speed of the vehicle to be known. The structure of the means 70 for detecting the r.p.m. of the output shaft 18 will be described in more detail with reference to FIGS. 14a and 14b. As seen in a side elevation in FIG. 14a, the toothed disc 72 which is secured at its center of rotation to the output shaft 18 is a discal plate of magnetic material having 32 equally spaced teeth formed along its circumference, and the r.p.m. detector 71 is mounted on the housing 30 at a position closely adjacent to the toothed disc 72 in the diametral direction of the latter. The r.p.m. detector 71 is composed of a permanent magnet 91 and a coil 92 wound around the magnet 91. The permanent magnet 91 and the coil 92 are housed in a suitable casing of nonmagnetic material and this casing is mounted on the transmission housing 30 so that one end of the permanent magnet 91 is disposed in close proximity to the outer periphery of the toothed disc 72. As the tooth portion of the toothed disc 72 passes through the magnetic field of the permanent magnet 91 as a result of the rotation of the toothed disc 72, a variation takes place in the leakage flux of the permanent magnet 91 so that an electromotive force is induced in the coil 92. In the case of the illustrated example, one complete rotation of the toothed disc 72 produces 32 voltage pulses. As previously described, a voltage signal at an AC voltage $S$ having a frequency $n \times N$ is commonly obtained when the toothed disc 72 having $n$ teeth rotates at a number of revolutions $N$ per unit time. The voltage signal appears across output terminals 93. It will be apparent to those skilled in the art that the detection of the speed of the vehicle may be attained by mounting a small-sized generator in coaxial relation to the driven gear connected with the speed meter by a cable and which detects the output from the generator.

Figure 15:
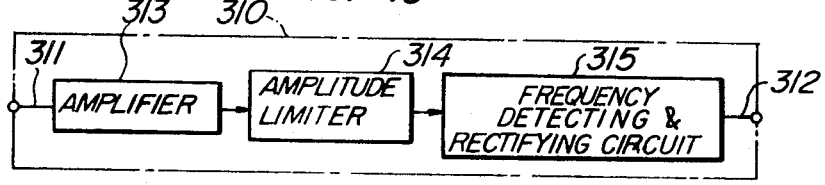
FIG. 15 is a block diagram showing the structure of a digital-analog converter preferably used in the shift signal control system.
Figure 16A:
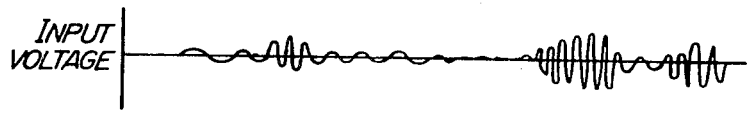
FIGS. 16a, 16b and 16c are graphic illustrations of the operating voltage waveforms appearing in the digital-analog converter shown in FIG. 15. 1
Figure 16B:
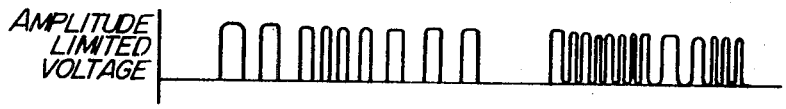
Figure 16C:
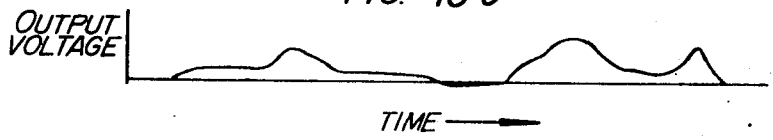

The output voltage signal $S$ delivered from the means 70 for detecting the r.p.m. of the output shaft 18 is supplied to the digital-analog converter 310 via a lead 311. The digital-analog converter 310 converts the AC signal $S$ or digital signal into a DC signal or analog signal. The digital-analog converter 310 has a structure as shown in FIG. 15. The input voltage signal $S$ is applied to the digital-analog converter 310 by the lead 311. In the digital-analog converter 310, an amplifier 313 amplifies the signal, an amplitude limiter 314 limits the amplitude of the signal to a fixed value, and a frequency detecting and rectifying circuit 315 converts the AC voltage into a DC voltage which is then led out by a lead 312. FIG. 16a shows the voltage waveform of the signal $S$, and the same waveform remains after the signal $S$ is amplified. FIG. 16b shows the waveform of the output from the amplitude limiter 314. FIG. 16c shows the waveform of the output $E_n$ from the frequency detecting and rectifying circuit 315 and this output $E_n$ is an analog voltage which is proportional to the r.p.m. of the output shaft 18.

Figure 17:
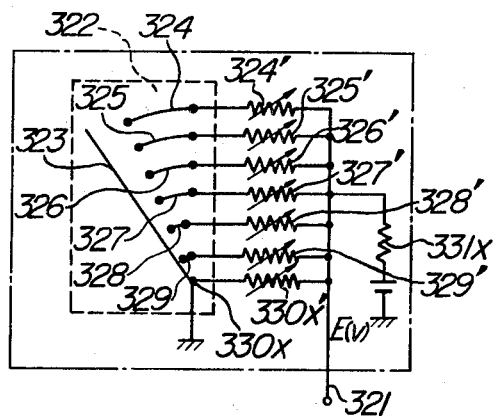
FIG. 17 is a circuit diagram showing the structure of a throttle position circuit preferably used in the shift signal control system.

The throttle position circuit 320 has a structure as shown in FIG. 17. The reference numeral 322 designates a multi-contact switch which is responsive to the position of the throttle valve in the carburetor or to the degree of depression of the accelerator pedal. Alternatively, this switch 322 may be responsive to a mechanical displacement representative of the negative pressure in the air intake pipe since the switch is a means for detecting an engine torque responsive signal. The switch 322 is provided with a movable contact 323 and a plurality of stationary contacts 324, 325, 326, 327, 328 and 329 and is so constructed that the movable contact 323 is successively released from contact with the stationary contacts 324, 325, 326, 327, 328 and 329 as the opening $S_\theta$ of the throttle valve is successively increased to $S_{\theta(1)}$, $S_{\theta(2)}$, $S_{\theta(3)}$, $S_{\theta(4)}$, $S_{\theta(5)}$ and $S_{\theta(6)}$. The movable contact 323 is grounded. The stationary contacts 324, 325, 326, 327, 328 and 329 are connected at one end to respective variable resistors 324', 325', 326', 327', 328' and 329', and one end of a variable resistor 330x' is connected to a point 330x of the movable contact 323 and is hence grounded. The variable resistors 324', 325', 326', 327', 328', 329' and 330x' are connected at the other end in common to a lead 321. A resistor 331x is connected at one end to the lead 321, and a fixed voltage $E_v$ is applied to the other end of the resistor 331x from the power unit 700. The variable resistor 330x' is so adjusted that a voltage $E_{(7)}$ appears on the lead 321 when $S_\theta = S_{\theta(7)}$ due the the full opening of the throttle valve in the carburetor. Then, when the throttle valve opening $S_\theta$ is reduced to $S_{\theta(6)}$, the movable contact 323 engages solely with the stationary contact 329. The variable resistor 329' is so adjusted that the output appearing on the lead 321 in such a position of the switch $$322 \text{ is given by } \frac{R_6//R_7}{R_6//R_7+R} \cdot E = E_{(6)}, \text{ where } R, R_6 \text{ and}$$

$R_7$ are the resistances of the resistor 331x, variable resistor 329' and variable resistor 330x', respectively, and $R_6//R_7$ is the resistance given when the variable resistors 329' and 330x' are connected in the circuit in parallel with each other. The variable resistor 328' is so adjusted that the output appearing on the lead 321 in response to the throttle valve opening $S_\theta$ of $S_{\theta(5)}$ is given by $$\frac{R_7//R_6//R_5}{R_7//R_6//R_5+R} \cdot E = E_{(5)}, \text{where } R_5 \text{ is the resistance}$$

of the variable resistor 328'. Similarly, the variable resistors 327', 326', 325' and 324' are so adjusted that the output appearing on the lead 321 in response to the throttle valve opening $S_\theta$ of $S_{\theta(4)}$, $S_{\theta(3)}$, $S_{\theta(2)}$ and $S_{\theta(1)}$ are given by $E_{(4)}$, $E_{(3)}$, $E_{(2)}$ and $E_{(1)}$, respectively. Thus, the voltages $E_{(1)}$, $E_{(2)}$, $E_{(3)}$, $E_{(4)}$, $E_{(5)}$, $E_{(6)}$ and $E_{(7)}$ appear on the lead 321 in response to the throttle valve opening $S_\theta$ of $S_{\theta(1)}$, $S_{\theta(2)}$, $S_{\theta(3)}$, $S_{\theta(4)}$, $S_{\theta(5)}$, $S_{\theta(6)}$ and $S_{\theta(7)}$, respectively. In other words, a stepped voltage $E_{(N)}$ ($N = 1, 2, 3, 4, 5, 6, 7$) is delivered to the lead 321 depending on the throttle position. In the embodiment, the switch 322 is shown as having six stationary contacts, but it is obvious that the number of stationary contacts may be increased to obtain a more complex stepped signal.

Figure 18:
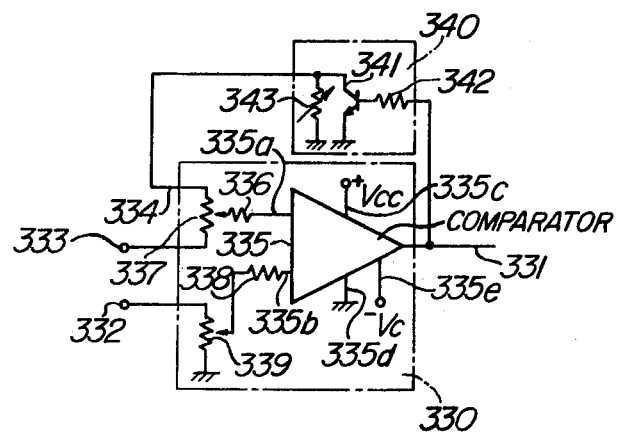
FIG. 18 is a circuit diagram showing the structure of a discriminating circuit and an associated feedback circuit preferably used in the shift signal control system.

The discriminating circuit 330, a feedback circuit 340 and the amplifier 350 constitute a computer circuit which is operative upon receiving the signal representative of the throttle valve opening and the signal representative of the output shaft r.p.m. to compare these two signals with each other thereby to determine the 2–3 and 3–2 shift points of the transmission. The discriminating circuit 330 and the feedback circuit 340 have a structure as shown in FIG. 18. The discriminating circuit 330 includes a comparator 335 of a universal type which may be one sold under the trade code namer of μpc71 by Nippon Electric Co., Ltd. or of SN72710N by the Texas Instruments Co., Ltd. An input resistor 336 is connected at one end to an input terminal 335a of the comparator 335 and at the other end to the movable arm of a variable resistor 337. A variable resistor 337 is connected across input terminals 333 and 334 of the discriminating circuit 330. A resistor 338 is connected at one end to an input terminal 335b of the comparator 335 and at the other end to the movable arm of a variable resistor 339. The variable resistor 339 is connected at one end to an input terminal 332 of the discriminating circuit 330 and is grounded at the other end. Terminals 335c, 335d and 335e connect the comparator 335 to the positive terminal of a power supply, to ground and to the negative terminal of the power supply, respectively. The feedback circuit 340 includes an NPN transistor 341, a resistor 342 and a variable resistor 343. The NPN transistor 341 has its emitter grounded and its base connected to an output lead 331 of the discriminating circuit 330 through the resistor 342. The collector of the transistor 341 is connected to the fixed terminal of the variable resistor 343 and the junction point is connected to the input terminal 334 of the discriminating circuit 330. The movable contact of the variable resistor 343 is grounded.

With respect to the operation of this circuit, the output lead 331 of the discriminating circuit 330 is supposed to be in the "1" state namely provided with a voltage, when no signals are applied to the input terminals 332, 333 and 334 of the discriminating circuit 330. The transistor 341 in the feedback circuit 340 conducts due to the supply of base current through the resistor 342, and the variable resistor 343 is short-circuited to ground. Then, when a signal voltage $E_{(N)}$ ($N$ = 1, 2, 3, ..........) representing the throttle position and a signal voltage $En$ representing the output shaft r.p.m. are applied to the respective input terminals 332 and 333 of the discriminating circuit 330, a voltage $$E_{n'} = \frac{Rb}{Ra+Rb} \cdot E_n$$

$En$ appears at the movable arm of the variable resistor 337, where $Ra$ is the resistance between the input terminal 333 and the movable arm of the variable resistor 337, and $Rb$ is the resistance between the movable arm of the variable resistor 337 and the collector of the transistor 341 in the feedback circuit 340, while a voltage $E_{(N)}$ appears at the movable arm of the variable resistor 339 and is given by $$E_{(N)'} = \frac{Re}{Rd+Re} \cdot E_{(N)},$$

where $Rd$ is the resistance between the movable arm of the variable resistor 339 and the input terminal 332, and $Re$ is the resistance between the movable arm of the variable resistor 339 and ground.

The voltage $E_{n'}$ is applied to the input terminal 335a of the comparator 335 through the resistor 336, and the voltage $E_{(N)'}$ is applied to the input terminal 335b of the comparator 335 through the resistor 338. The comparator 335 compares $E_{(N)'}$ with $E_{n'}$. When $E_{n'} - E_{(N)'}$ is positive, "0" or no output signal is delivered from the comparator 335, while when $E_{n'} - E_{(N)'}$ is negative, "1" or an output signal is delivered from the comparator 335 to appear on the output lead 331. The resistors 336 and 338 are protective resistors which protect the comparator 335 from any unusually large inputs which may be applied to the input terminals thereof. The comparator 335 may be composed of a differential amplifier and a Zener diode or a Schmitt circuit.

When "0" or no output signal voltage appears on the output lead 331 of the discriminating circuit 330 due to $E_{n'} - E_{(N)'} > 0$, no base current is supplied to the base of the transistor 341 through the resistor 342 in the feedback circuit 340 thereby to cut off the transistor 341. Assuming therefore that the resistance of the variable resistor 343 is $Rc$, the potential appearing at the input terminal 335a of the comparator 335 is given by $$E_{n''} = \frac{Rb + Rc}{Ra+Rb+Rc} \cdot E_n \text{ and } E_{n''} > E_{n'}$$

despite the fact that the voltage $E_n$ remains the same. Thus, the transistor from "0" to "1" of the output appearing on the output lead 331 of the comparator 335 occurs at a smaller value of $E_n$, hence at a lower vehicle speed than when the transition from "1" to "0" of the output occurs. In other words, the amount of modification of the output shaft r.p.m. signal $E_n$ by the resistors is varied to change the discriminating condition of the discriminating circuit depending on "0" or "1" of the output signal voltage fed back from the output lead 331 through the feedback circuit 340. By this means, the signal appearing on the output lead 331 is stabilized and no "hunting" occurs between on and off.

Figure 19:
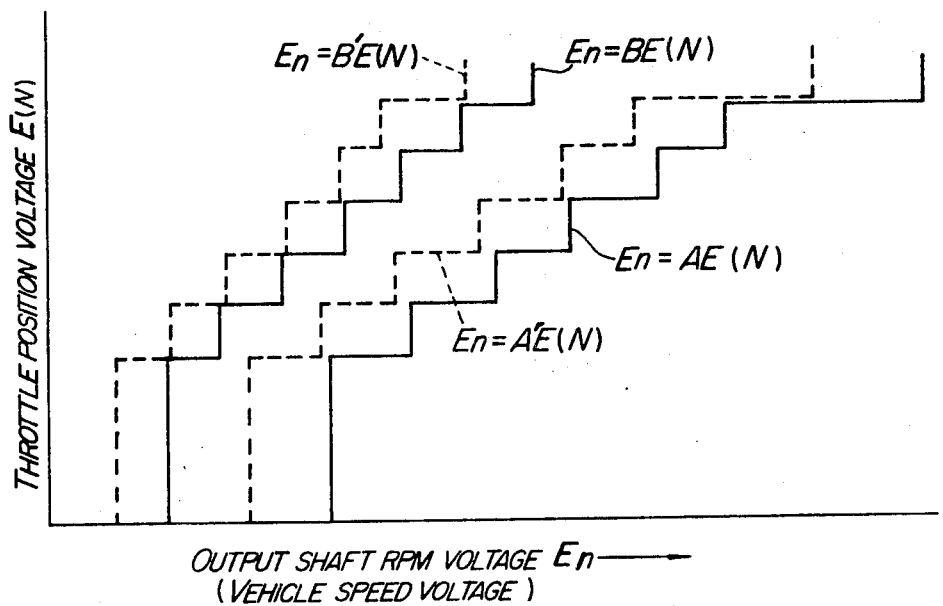
FIG. 19 is a chart showing the relation between a signal representative of the output shaft r.p.m. and a signal representative of the throttle position to illustrate the shift ranges according to the present invention when the shift lever is in the $D_1$ or $D_2$ position.

It will thus be understood that, by suitably selecting the setting of the variable resistors 337, 339 and 343 in the discriminating circuit 330 and feedback circuit 340, it is possible to compute the relation $E_n = AE_{(N)}$ between the output shaft r.p.m. signal $E_n$ and the throttle position signal $E_{(N)}$ when the signal appearing on the output lead 331 changes from "1" to "0," and also to compute the relation $E_n = A'E_{(N)}$ between these two signals when the signal appearing on the output lead 331 changes from "0" to "1." Therefore, when $E_n$ in FIG. 19 increases to shift to the region on the right-hand side of the line $E_n = A E_{(N)}$, the signal appearing on the output lead 331 changes from "1" to "0" or no output signal appears on the output lead 331. On the other hand, $E_n$ is decreased in the state of the appearance of no voltage on the output lead 331 to such an extent that the relation $E_n \leq A'E_{(N)}$ holds so that the signal voltage appears on the output lead 331 again.

The amplifier 350 is a conventional one and its sole function is amplification of the output signal from the discriminating circuit 330 for energizing the solenoid 137. The amplifier 350 is unnecessary when the output signal from the discriminating circuit 330 can satisfactorily energize the solenoid 137. The solenoid 137 is well known in the art and any description thereof will be unnecessary. It is obvious that an alternative circuit arrangement may be employed so that "1" is delivered from the discriminating circuit 330 to appear on the output lead 331 when $E_n - E_{(N)} > 0$, while "0" appears on the output lead 331 when $E_n - E_{(N)} < 0$, and the solenoid 137 is energized in response to the appearance of the signal voltage on the output lead 331. Although the illustrated example refers to the case in which the feedback circuit 340 acts to vary the potential at the input terminal 335a, the same result can be obtained by varying the potential at the input terminal 335b in a manner contrary to the variation of the potential at the input terminal 335a.

The digital-analog converter 310 is so constructed that a gradually increasing positive voltage appears on the output lead 312 as the frequency supplied through the input lead 311, hence the speed of the vehicle is increased. The output lead 321 of the throttle position circuit 320 may be connected with the output lead 312 of the digital-analog converter 310, and the input terminal 332 of the discriminating circuit 330 which has been connected with the output lead 321 of the throttle position circuit 320 may be connected to ground or to a source of fixed voltage to obtain a zero balance. The throttle position circuit 320 may be constructed so that the resistance between the output thereof and ground is reduced as the opening of the throttle valve is increased thereby to set up a similar relation between the two signals.

Alternatively, the digital-analog converter 310 may be so constructed that a gradually negative going voltage appears on the output lead 312 as the speed of the vehicle is increased. In this case too, the throttle position circuit 320 may be so constructed that the resistance between the output thereof and ground is reduced as the opening of the throttle valve is increased, and the output of the digital-analog converter 310 and the output of the throttle position circuit 320 may be connected in common to the input terminal 333 of the discriminating circuit 330, while the input terminal 332 of the discriminating circuit 330 may be connected to ground or to a source of fixed voltage to obtain a zero balance thereby to set up a similar relation between the two signals.

The circuit for computing the 1–2 and 2–1 shift points will next be described. The circuit includes a discriminating circuit 330' and an associated feedback circuit 340' for computing the shift points between the first and second speeds at the $D_1$ and $D_2$ positions, a discriminating circuit 330'' and an associated feedback circuit 340'' for computing the shift points between the first and second speeds at the L position, a gate circuit 354 for selecting one of the output signals from these discriminating circuits 330' and 330'' depending on a signal supplied through the neutral safety switch 610, and an amplifier 356. The structure and function of the discriminating circuit 330' and feedback circuit 340' for computing the shift points between the first and second speeds at the $D_1$ and $D_2$ positions are entirely similar to those of the discriminating circuit 330 and feedback circuit 340 which computes the 2–3 and 3–2 shift points. Variable resistors in the discriminating circuit 330' and feedback circuit 340' are suitably regulated so as to compute the relation $E_n = B\ E_{(x)}$ between the output shaft r.p.m. signal $E_n$ and the throttle position signal $E_{(x)}$ when the signal appearing on an output lead 331' changes from "1" to "0" or no voltage appears on the output lead 331' and also to compute the relation $E_n = B'E_{(x)}$ between these two signals when the signal appearing on the output lead 331' changes from "0" to "1" or a voltage appears on the output lead 331'. Thus, referring to FIG. 19, the signal voltage having appeared on the output lead 331' disappears, that is, "1" is changed to "0" when the output shaft r.p.m. signal $E_n$ is increased to an extent that the relation $E_n \geq B\ E_{(x)}$ is satisfied. On the other hand, the signal voltage appears on the output lead 331' again when $E_n$ is decreased to an extent that it satisfies the relation $E_n \leq B'E_{(x)}$.

Figure 20:
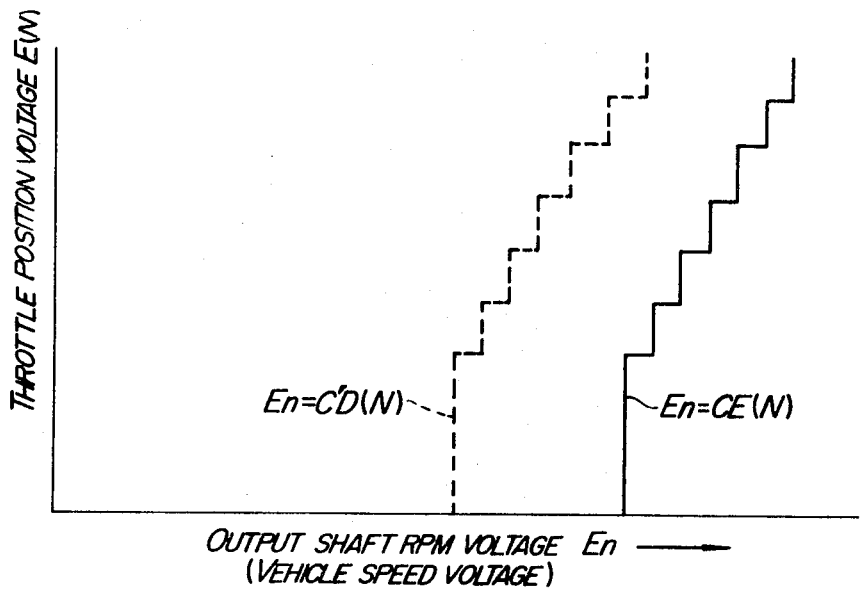
FIG. 20 is a chart showing the relation between the output shaft r.p.m. signal and the throttle position signal to illustrate the shift ranges according to the present invention when the shift lever is in the L position.

The structure and function of the discriminating circuit 330'' and feedback circuit 340'' for computing the 1–2 and 2–1 shift points at the L position are also similar to those of the discriminating circuit 330 and feedback circuit 340 except that, while the output shaft r.p.m. signal $E_n$ and the throttle position signal $E_{(x)}$ are applied to the respective input terminals 333 and 332 of the discriminating circuit 330, the throttle position signal $E_{(x)}$ and the output shaft r.p.m. signal $E_n$ are applied to respective input terminals 333'' and 332'' of the discriminating circuit 330''. Therefore, the throttle position signal $E_{(x)}$ is now affected by the operation of the feedback circuit 340'', and a transistor 341'' in the feedback circuit 340'' conducts in response to the appearance of "1" on an output lead 331'' with the result that a lower voltage appears on the movable arm of a variable resistor 337'' in the discriminating circuit 330'' than when "0" appears on the output lead 331''. A comparator 335'' compares a voltage $E_{(x)'}$ appearing at the movable arm of the variable resistor 337'' with a voltage $E_{n'}$ appearing at the movable arm of a variable resistor 339''. When $E_{(x)'} - E_{n'}$ is positive, "0" or no signal voltage appears on the output lead 331'', while when $E_{(x)'} - E_{n'}$ is negative, "1" or a signal voltage appears on the output lead 331''. By suitably regulating the variable resistors in the discriminating circuit 330'' and feedback circuit 340'' having such a structure, it is possible to compute the relation $E_n = C\ E_{(x)}$ between the output shaft r.p.m. signal $E_n$ and the throttle position signal $E_{(x)}$ when the signal appearing on the output lead 331'' changes from "0" to "1" and also to compute the relation $E_n = C'E_{(x)}$ between these two signals when the signal appearing on the output lead 331'' changes from "1" to "0." The relation between $E_{(x)}$ and $E_n$ in the case of the discriminating circuit 330'' and feedback circuit 340'' is shown in FIG. 20. It will be seen from FIG. 20 that the signal appearing on the output lead 331'' changes from "0" to "1," that is, a signal voltage appears on the output lead 331'' when $E_n$ is increased to shift to the region on the right-hand side of the line $E_n = C\ E_{(x)}$, while the signal appearing on the output lead 331'' changes from "1" to "0," that is, the signal voltage disappears when $E_n$ is decreased in the presence of the signal voltage to such an extent that the relation $E_n \leq C'E_{(x)}$ holds. The output leads 331' and 331'' of the respective discriminating circuits 330' and 330'' are connected to the gate circuit 354, and in response to the "L" position signal delivered from the neutral safety switch 610, the outputs of the discriminating circuits 330' and 330'' are selectively permitted to appear on an output lead 355 through the gate circuit 354.

Figure 21:
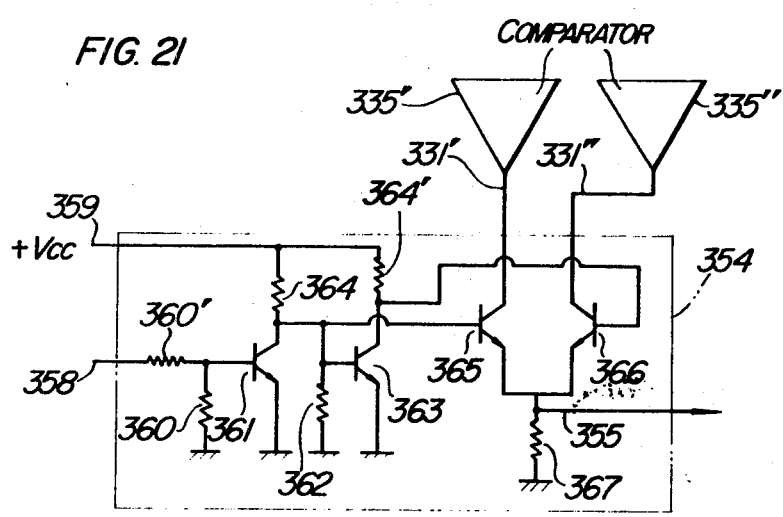
FIG. 21 is a circuit diagram showing the structure of a gate circuit preferably used in the shift signal control system.

The structure and function of one form of the gate circuit 354 will be described with reference to FIG. 21. Referring to FIG. 21, a lead 359 is connected to the power unit 700 to receive power therefrom, and a lead 358 is connected to the L position terminal of the neutral safety switch 610. An NPN transistor 361 has its emitter grounded, its base connected to the lead 358 through a resistor 360' and grounded through a resistor 360, and its collector connected to the lead 359 through a resistor 364. An NPN transistor 363 has its emitter grounded, its base connected to the collector of the transistor 361 and grounded through a resistor 362, and its collector connected through a resistor 364' to the lead 359 connected to the power unit 700. An NPN transistor 365 has its emitter connected to the output lead 355 of the gate circuit 354 and grounded through a resistor 367, its base connected to the collector of the NPN transistor 361 and to the base of the NPN transistor 363, and its collector connected to the output lead 331' of the comparator 335'. An NPN transistor 366 has its emitter connected to the emitter of the transistor 365, its base connected to the collector of the transistor 363, and its collector connected to the output lead 331'' of the comparator 335''.

When now the shift lever 601 is set at its $D_1$ or $D_2$ position, no voltage appears on the lead 358 connected to the L position terminal of the neutral safety switch 610 and no base current is supplied to the transistor 361, which is therefore cut off. In this state, a voltage appears at the collector of the transistor 361 to supply base current to the transistors 363 and 365 thereby to turn on the transistors 363 and 365. When the transistor 363 conducts, no base current is supplied to the transistor 366 to cut off the transistor 366 and the output lead 331'' of the comparator 335'' is disconnected from the output lead 355 of the gate circuit 354. Since the transistor 365 is in its on state, the output lead 331' of the comparator 335' is connected to the output lead 355 of the gate circuit 354. That is, in the $D_1$ or $D_2$ position of the shift lever 601, the transistors 363 and 365 are turned on and the output from the discriminating circuit 330' appears as an output from the gate circuit 354.

When the shift lever 601 is shifted to the L position, base current is supplied via the lead 358 to the transistor 361 to turn on the transistor 361 so that the transistors 363 and 365 are turned off and the transistor 366 is turned on. As a result, the output lead 331' of the comparator 335' is disconnected from the output lead 355 of the gate circuit 354, while the output lead 331'' of the comparator 335'' is connected with the output lead 355 of the gate circuit 354. That is, in the L position of the shift lever 601, the transistors 361 and 366 are turned on and the output from the discriminating circuit 330'' appears as an output from the gate circuit 354. The output signal delivered from the gate circuit 354 is amplified by the amplifier 356 to energize the solenoid 132.

It will thus be seen that the gate circuit 354 determines the shift points between the first and second speeds by the output delivered from the discriminating circuit 330' when the shift lever 601 is in the $D_1$ or $D_2$ position and by the output delivered from the discriminating circuit 330'' when the shift lever 601 is in the L position.

SHIFT CONTROL OPERATION

In the L, $D_1$ and $D_2$ positions of the shift lever 601, the circuit opening switch 620 is in its closed position to supply current to the power unit 700 thereby to place the shift signal control system in operation. The relation between the operating state of the solenoids and the speed ratio or gear position of the transmission, which has been given in the description relating to the hydraulic actuating system and shift control system, is summarized in the following tables:

TABLE 1 $D_1$ POSITION

| Gear position | Solenoid 132 | Solenoid 137 |
| --- | --- | --- |
| 1st speed | Energized | Energized |
| 2nd speed | Deenergized | Energized |

| | | |
|---|---|---|
| 2rd speed | Deenergized | Deenergized |

TABLE 2 L POSITION

| Gear position | Solenoid 132 |
|---|---|
| 1st speed | Deenergized |
| 2nd speed | Energized |

In the case of the $D_2$ position, the relation between the operating state of the solenoids and the gear position of the transmission is the same as that in the $D_1$ position, but no shift to third gear occurs due to the fact that no fluid pressure is supplied to the 2–3 shift means 135 while in the $D_2$ position.

1–2 Shift Control Operation

Figure 22:
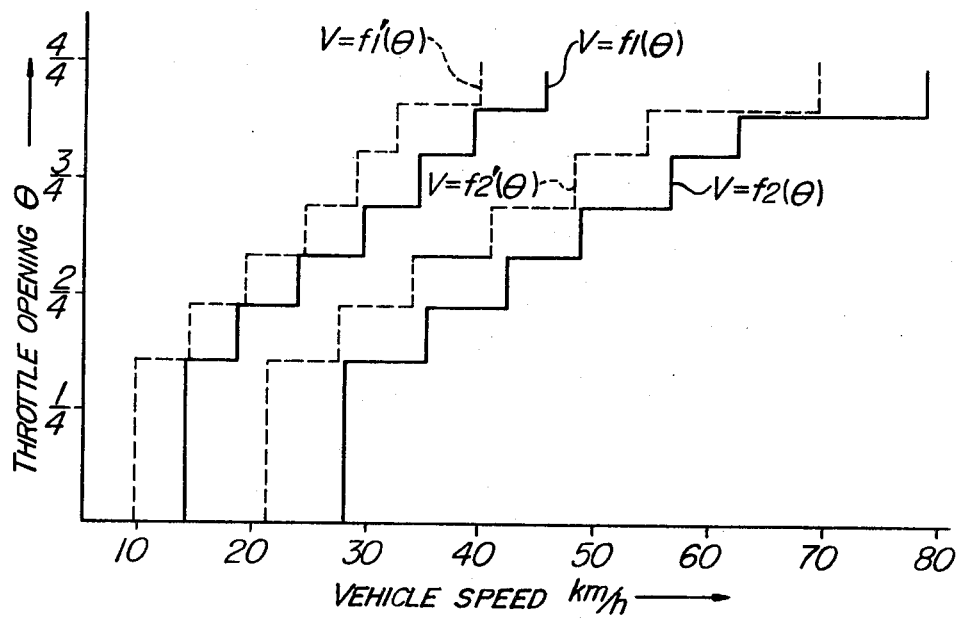
FIG. 22 is a shift diagram showing one example of the shift ranges when the shift lever is in the $D_1$ or $D_2$ position.
Figure 23:
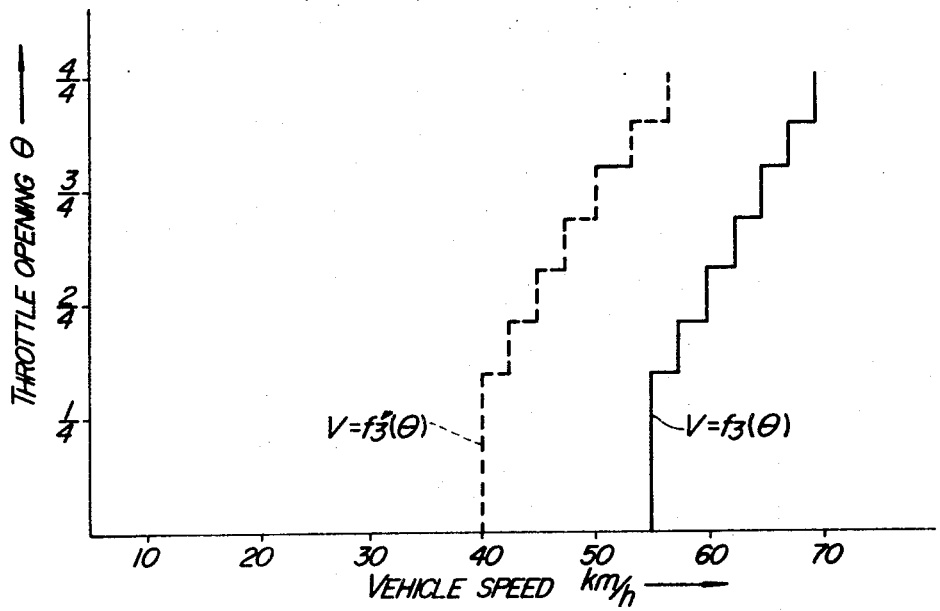
FIG. 23 is a shift diagram showing one example of the shift ranges when the shift lever is in the L position.

In FIGS. 22 and 23, the relation between the output shaft r.p.m. signal $E_n$ and the throttle position signal $E_{(x)}$ shown in FIGS. 19 and 20 is expressed in terms of the relation between the vehicle speed $V$ and the throttle valve opening $\theta$. In the $D_1$ and $D_2$ positions of the shift lever 601, the relation $E_n \geq B E_{(x)}$ holds when the vehicle speed shifts to the right-hand side (i.e., high speed side of the line $V=f_1(\theta)$ shown in FIG. 22 and "0" or no voltage appears at the output of the discriminating circuit 330' with the result that the solenoid 132 is de-energized and a shift from the first to second speed occurs. In the second speed, no voltage is supplied to the feedback circuit 340' and the NPN transistor 341' is cut off. The voltage division ratio for the output shaft r.p.m. signal $E_n$ by the variable resistors is now changed so that the discriminating circuit 330' is ready to carry out the computation of $E_n \geq B'E_{(x)}$. The line $V=f_{1'}(\theta)$ represents the shift point from the second to first speed. The solenoid 132 is energized to cause a shift from the second speed to first when the vehicle speed shifts to the left-hand side of the line $V=f_{1'}(\theta)$. The provision of hysteresis between the 1–2 shift point and the 2–1 shift point is common practice in conventional automatic transmissions for the purpose of the stability of the shift.

The shift lever 601 is shifted to the L position, the L position signal is applied to the gate circuit 354 so that the discriminating circuit 330" now controls the operation of the solenoid 132. The relation $E_n \geq C E_{(x)}$ holds when the vehicle speed shifts to the right-hand side of the line $V=f_3(\theta)$ in FIG. 23, and "1" or a voltage appears on the output lead 331" of the discriminating circuit 330" to energize the solenoid 132 thereby to cause a shift from the first speed to second. In the second speed, the voltage is supplied to the feedback circuit 340" to turn on the NPN transistor 341". The voltage division ratio for the throttle position signal $E_{(x)}$ is changed so that the discriminating circuit 330" is already to carry out the computation of $E_n \geq C'E_{(x)}$. The line $V=f_{3'}(\theta)$ represents the shift point from the second to first speed. The solenoid 132 is de-energized to cause a shift from the second to first speed when the vehicle speed shifts to the left-hand side of the line $V=f_{3'}(\theta)$ and "0" appears on the output lead 331" of the discriminating circuit 330".

In this manner, the shift point in the L position is computed by the discriminating circuit 330" and a shift to the second speed occurs in response to energization of the solenoid 132, while a shift to the first speed occurs in response to de-energization of the solenoid 132. This relation is entirely contrary to the relation in the $D_1$ or $D_2$ position. Further, in view of the fact that the engine braking is primarily applied in the L position, the shift point in the low throttle position is set at a considerably higher speed compared with that of the $D_1$ or $D_2$ position.

2–3 Shift Control Operation

A shift from the second to third speed is carried out in the $D_1$ position. The relation $E_n \geq A E_{(x)}$ holds when the state of the vehicle makes a shift to the right-hand side of the line $V=f_2(\theta$ shown in FIG. 22, and "0" or no voltage appears on the output lead 331 of the discriminating circuit 330 thereby causing a shift from the second to third speed. Since no signal appears on the output lead 331 of the discriminating circuit 330, no voltage is supplied to the feedback circuit 340 thereto cut off the NPN transistor 341 so that the discriminating circuit 330 is ready to carry out the computation of $E_n \geq A'E_{(x)}$. The line $V=f_{2'}(\theta)$ represents the downshift point from the third speed to second. The solenoid 137 is energized to cause a shift from the third speed to second when the vehicle speed shifts to the left-hand side (i.e., low speed side) of the line $V=f_{2'}(\theta)$.

Figure 24:
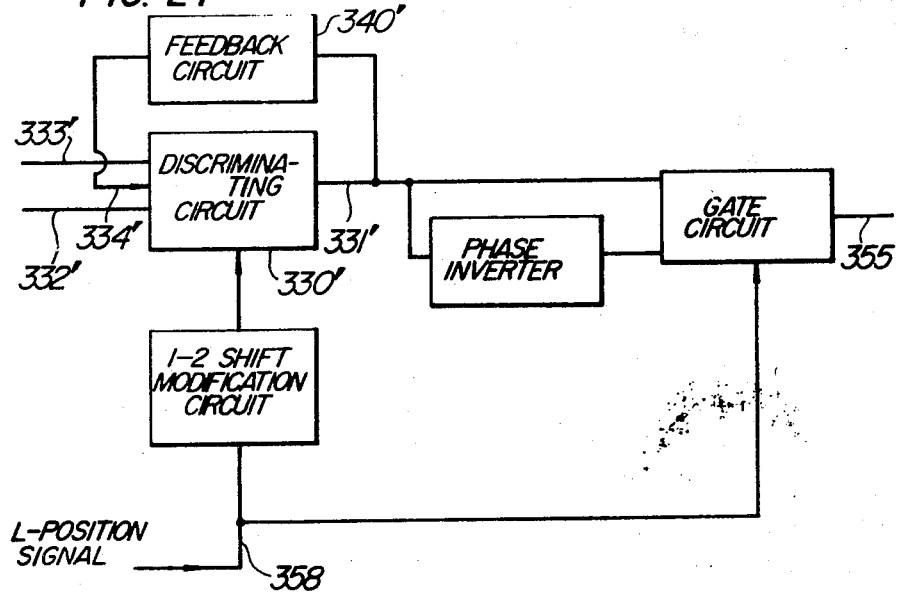
FIG. 24 is a block diagram of a modification of the 1–2 shift system in the shift signal control system shown in FIG. 13, the modification employing only one 1–2 shift discriminating circuit in lieu of two.

The embodiment described above includes two discriminating circuits 330' and 330" for the 1–2 shift and a gate circuit 354 for selectively passing the output signals of the discriminating circuits 330' and 330" therethrough. However these two discriminating circuits are not necessarily required. A modification of this part of the shift signal control system as shown in FIG. 24 includes only one discriminating circuit 330', and in lieu of the discriminating circuit 330", a 1–2 shift modifying circuit and a phase inversion circuit are provided. The 1–2 shift modifying circuit is a means which varies the voltage division ratio for, for example, the vehicle speed responsive signal depending on the presence or absence of the L position signal sent from the neutral safety switch 610 thereby to obtain shift diagrams for the $D_1$ and $D_2$ positions and the L position as shown in FIGS. 22 and 23. The output lead 3 31' of the discriminating circuit 330' is divided into two branch leads, one of which is directly connected to the gate circuit so as to directly apply the output from the discriminating circuit 330' to the gate circuit, while the other is connected through the phase inversion circuit to the gate circuit so as to apply an inverted signal ("0" or "1" when the output is "1" or "0") of the output of the discriminating circuit 330' to the gate circuit. Thus, the output from the discriminating circuit 330' appears in the noninverted from as an output from the gate in the absence of the L position signal and the inverted signal appears as an output from the gate in the presence of the L position signal. This computer circuit can therefore operate in the same manner as the computer circuit shown in FIG. 13.

For the purpose of achieving a better understanding of the present invention, the features of the present invention will be enumerated as follows:

1. The automatic transmission includes a three-speed power train capable of obtaining the freewheeling first speed in the $D_1$ or $D_2$ position of the manual valve and the brake-band engaged first speed in the L position of the manual valve.

2. Two fluid passages, one for the L position and the other for the $D_1$ or $D_2$ position, lead out from the manual valve to the 1–2 shift means, and two fluid passages lead out from the 1–2 shift means, one leading to the servo chamber for the rear brake band for establishing the first speed gear position and the other leading to the servo chamber for the front brake band for establishing the second speed gear position.

3. The 1–2 shift valve element is actuated by the solenoid in response to a signal supplied from the shift signal control system thereby to control the communication between the passages for the incoming and outgoing fluids. The 1–2 shift valve element is urged to its leftward position in response to energization of the solenoid and to its rightward position in response to deenergization of the solenoid. The positions of the manual valve and the 1–2 shift valve relative to the gear position are shown in Table 3.

TABLE 3

| Manual valve | L-position | | $D_1$ or $D_2$ position | |
|---|---|---|---|---|
| | | | | |
| 1–2 shift valve | Leftward position | Rightward position | Leftward position | Rightward position |
| Gear position | 2nd speed | 1st speed | 1st speed | 3rd or 2nd speed |

4. As will be apparent from Table 3, the gear position in the L position of the manual valve is entirely contrary to that in the $D_1$ ro $D_2$ position of the manual valve despite the fact that the 1–2 shift valve is in the same position. Such an operation can be carried out by inverting the output signal delivered from the shift signal control system in the L position of the manual valve from that delivered from the shift signal control system in the $D_1$ or $D_2$ position of the manual valve.

5. The shift lever is movable in an H-shaped slot having two parallelly arranged slot portions labeled with the positions in the order of $$P, R, N, \frac{D_1, D_2, L,}{3, \ 2, \ 1.}$$

When the shift lever is moved to any one of the 3, 2 and 1 positions in one slot portion, the circuit opening switch is turned off to break the current supplied to the shift signal control system.

The present invention with the above features has the following advantages:

a. In the L position of the manual valve, one of the fluid passages leading out from the manual valve is selectively connectable through the 1–2 shift means to the fluid passages leading to the servo chambers for the rear and front brake bands. It is thus possible to select a suitable shift point in the L position by suitably setting the shift signal control system. Especially, undesirable overrunning of the engine during a 2–1 downshift in the L position can be prevented.

b. The current supplied to the shift signal control system is cut off when the shift lever is moved to any one of the 1, 2 and 3 positions so that the vehicle can be driven at the first speed, second speed and third speed in the 1, 2 and 3 positions, respectively that is, the vehicle can be driven under semiautomatic control. Thus, the vehicle can be freely driven in the semiautomatic position even when trouble occurs in the shift signal control system. Shifting of the shift lever to the "2" position places the gear in the second speed gear position and smooth starting of the vehicle can be done in such a position too. Automatic and semiautomatic controls of the vehicle can be done as desired by virtue of the provision of the L, $D_1$, $D_2$, 1, 2 and 3 positions thereby giving a variety to the shift operation.

c. Two devices each including a shift valve a solenoid and a computer circuit are primarily required for a 1–2 shift control. However, as described in (4) of the feature of the present invention, these two devices are unified into a single device by the unique combination of the 1–2 shift valve, the fluid passage arrangement and the inversion of the shift signal output, thereby remarkably simplifying the structure of the shift signal control system and hydraulic actuating circuit which leads to a compact transmission system. Various other features and advantages of the present invention will be apparent from the detailed description given hereinbefore.

While a preferred embodiment of the present invention has been described with regard to a three-forward speed and one-reverse speed automatic transmission, it will be apparent to those skilled in the art that various changes and modifications may be made therein without departing from the scope of the appended claims.

We claim:

1. In a shift control system for a fluid controlled vehicle transmission having a hydraulic torque converter, a gear unit, frictionally engaging means for accomplishing a selective meshing engagement of the gears in said gear unit, servo means operatively associated with said frictionally engaging means for producing ratio changes by selectively actuating said frictionally engaging means, and a hydraulic actuating circuit connecting said servo means to a source of fluid pressure, the improvement comprising:

a manual shift range setting valve means having a first position for establishing a relatively high forward drive ratio and a second position for establishing a relatively low forward drive ratio disposed in said hydraulic actuating circuit, a shift valve means disposed in said hydraulic actuating circuit between said servo means and said manual shift range setting valve means having two positions to selectively pass and stop the fluid through said hydraulic actuating circuit to thereby control the operation of said frictionally engaging means, and an electrical shift valve control means for controlling said shift valve means to be urged to one position of said two positions or to the other position, said shift valve means, when said manual shift range setting valve means is in the first position, supplying fluid pressure to said servo means so as to establish a high forward drive ratio at said one position and a low forward drive ratio at said other position and, when said manual shift range setting valve means is in the second position, supplying fluid to said servo means so as to establish a low forward drive ratio at said one position and a high forward drive ratio at said other position contrary to the case when said manual shift range setting valve means is in the first position.

2. The shift control system as claimed in claim 1 wherein said shift valve means comprises an electrical operator and said means for controlling said shift valve means comprises means responsive to vehicle operating conditions for generating at least two electrical signals, at least a first and a second discriminating circuit for comparing said electrical signals and producing outputs when one of said signals exceeds the other, an electrical gate for connecting either said first or said second discriminating circuits to said electrical operator and means for controlling said gate associated with said manual range setting means.

3. The shift control system as claimed in claim 2 wherein the means for generating two electrical means comprises a toothed disc of magnetic material securely mounted coaxially on the output shaft of said vehicle transmission and a coil located adjacent to the outer periphery of said toothed disc the axis of said coil being located on a line radial to said disc whereby a voltage having a frequency proportional to the rotational speed of said output shaft is induced in said coil, and a movable contact mechanically connected with the carburetor throttle of a said vehicle, a plurality of fixed contacts arranged to engage with said movable contact each of said fixed contacts connected through a separate resistance to a source of electrical power and a voltage tap line connected in common between said resistances and said power source wherein the movement of said carburetor throttle causes said movable contact to engage a varying number of fixed contacts and thus to vary the output voltage on said voltage tap line proportional to the setting of said carburetor throttle.

4. The shift control system as claimed in claim 2 wherein each discriminating circuit has two input leads and said electrical signals are connected oppositely to the leads of said second discriminating circuit with respect to their connections with said first discriminating circuit so that each discriminating circuit produces an output when a different one of said electrical signals predominates the other signal.

5. The shift control system as claimed in claim 2 wherein said means for controlling said gate includes an input lead to said gate said gate connecting said first discriminating circuit to said electrical operator in the absence of a signal upon said input lead and connecting said second discriminating circuit to said electrical operator in the presence of a signal upon said input lead.

6. The shift control system as claimed in claim 5 wherein said means associated with said manual shift range setting means includes a source of electrical power and a switch mechanically connected to said manual shift range setting valve means and electrically connected between said source of electrical power and said input leads, said switch being open when said manual shift range setting means is in said first position and closed when said manual shift range setting means is in said second position.

7. The shift control system of claim 6 wherein each of said discriminating circuits includes a feedback circuit connected between said output lead of said comparator and said first input lead thereof for adding a portion of the output signal produced by said discriminating circuit to the input signal at said first input lead whereby signals on said output lead are stabilized.

8. In a fluid controlled automatic transmission for a vehicle having a hydraulic torque converter, a gear unit, frictionally engaging means for accomplishing the selective meshing engagement of the gears in said gear unit, servo means operatively associated with said frictionally engaging means for providing ratio changes by selectively actuating said frictionally engaging means, and a hydraulic actuating circuit connecting said servo means to a source of fluid pressure, an automatic shift control system comprising manual shift range setting valve means responsive to the position of a shift lever and having a first position for establishing a relatively high forward drive ratio and a second position for establishing a relatively low forward drive ratio, shift valve means disposed in said hydraulic actuating circuit between said manual shift range setting valve means and said servo means to selectively pass and stop the fluid through said hydraulic actuating circuit to thereby control the operation of said frictionally engaging means, means for generating a signal responsive to the throttle position, means for generating a signal responsive to the r.p.m. of the output shaft, a plurality of discriminating circuits having their input terminals connected to the outputs of said throttle position responsive signal generator and said vehicle speed responsive signal generator, means including a solenoid for controlling the operation of said shift valve means, a gate circuit connected between the outputs of said discriminating circuits and said solenoid for selectively applying the outputs from said discriminating circuits to said solenoid, and switch means responsive to the position of the shift lever, said switch means having a lead connected to said gate circuit for controlling the operation of said gate circuit depending on the first and second position of the shift lever, in which a high forward drive ratio is provided when said shift valve means is urged to one position by said solenoid in the first position of said manual shift range setting valve means, while in the second position of said manual shift range setting valve means, the same position of said shift valve means provides a low forward drive ratio.

9. An automatic shift control system as claimed in claim 8, in which, when said manual shift range setting valve means is in the first position, a low and a high forward drive ratio are provided respectively depending on the energization and deenergization of said solenoid, while when said manual shift range setting valve means is in the second position, a low and a high forward drive ratio are provided respectively depending on the deenergization and energization of said solenoid.

* * * * *